United States Patent
Kanda et al.

(10) Patent No.: US 10,181,753 B2
(45) Date of Patent: Jan. 15, 2019

(54) ELECTRIC POWER SYSTEM PROTECTION DEVICE, ELECTRIC PATH SWITCHING DEVICE, AND ELECTRIC POWER SUPPLY SYSTEM

(71) Applicant: Panasonic Intellectual Property Management Co., Ltd., Osaka (JP)

(72) Inventors: Masataka Kanda, Osaka (JP); Satoru Ueno, Osaka (JP); Kenji Yamaguchi, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 352 days.

(21) Appl. No.: 14/781,902

(22) PCT Filed: Mar. 10, 2014

(86) PCT No.: PCT/JP2014/001331
§ 371 (c)(1),
(2) Date: Oct. 1, 2015

(87) PCT Pub. No.: WO2014/162663
PCT Pub. Date: Oct. 9, 2014

(65) Prior Publication Data
US 2016/0028274 A1 Jan. 28, 2016

(30) Foreign Application Priority Data
Apr. 1, 2013 (JP) .................. 2013-076433

(51) Int. Cl.
*H02J 7/00* (2006.01)
*H02J 9/06* (2006.01)
(Continued)

(52) U.S. Cl.
CPC .............. *H02J 9/06* (2013.01); *B60L 3/0069* (2013.01); *B60L 3/04* (2013.01); *B60L 11/1818* (2013.01);
(Continued)

(58) Field of Classification Search
CPC ............ H05B 37/0272; H05B 33/0815; H05B 33/0854; H02M 1/32
See application file for complete search history.

(56) References Cited

U.S. PATENT DOCUMENTS 8,649,132 B2 2/2014 Yang
2008/0080835 A1* 4/2008 Hutten ............... H04N 5/44543
386/291
(Continued)

FOREIGN PATENT DOCUMENTS

JP 07-021901 A 1/1995
JP H08-279331 A 10/1996
(Continued)

OTHER PUBLICATIONS

International Search Report dated Apr. 8, 2014 issued in International Patent Application No. PCT/JP2014/001331 (partial English translation).

*Primary Examiner* — Sibin Chen
(74) *Attorney, Agent, or Firm* — McDermott Will & Emery LLP

(57) ABSTRACT

The electric power system protection device according to the present invention includes a transformer including a primary winding and a secondary winding which are electrically isolated from each other. The primary winding is to be connected to a first electric path which is to be connected to an external power supply configured to supply AC power by use of a secondary battery, so as to receive the AC power from the external power supply. The secondary winding is to be connected to a second electric path to be connected to a power supply path from a commercial electric power system to an electric load.

3 Claims, 15 Drawing Sheets

(51) Int. Cl.
  *H02H 7/26* (2006.01)
  *B60L 3/00* (2006.01)
  *B60L 3/04* (2006.01)
  *B60L 11/18* (2006.01)
  *H02H 3/08* (2006.01)
  *H02H 3/20* (2006.01)
  *H02H 3/24* (2006.01)
  *H02H 3/32* (2006.01)

(52) U.S. Cl.
  CPC ............. *H02H 7/26* (2013.01); *H02J 7/0031* (2013.01); *H02H 3/08* (2013.01); *H02H 3/20* (2013.01); *H02H 3/24* (2013.01); *H02H 3/32* (2013.01); *H02J 2009/068* (2013.01); *Y02T 10/7005* (2013.01); *Y02T 10/7072* (2013.01); *Y02T 90/14* (2013.01)

(56) References Cited

U.S. PATENT DOCUMENTS

| | | | | |
|---|---|---|---|---|
| 2009/0217073 A1* | 8/2009 | Brech | ........................ | G06F 1/28 713/340 |
| 2010/0141153 A1* | 6/2010 | Recker | ............... | H05B 33/0803 315/149 |
| 2011/0278934 A1* | 11/2011 | Ghosh | ..................... | H02J 9/062 307/66 |
| 2012/0092897 A1* | 4/2012 | Hara | ....................... | H02J 9/005 363/16 |
| 2012/0162844 A1 | 6/2012 | Yang | | |
| 2013/0241496 A1 | 9/2013 | Kurayama | | |
| 2014/0002011 A1 | 1/2014 | Ang et al. | | |

FOREIGN PATENT DOCUMENTS

| | | |
|---|---|---|
| JP | H10-201077 A | 7/1998 |
| JP | 11-234892 A | 8/1999 |
| JP | 2003-250230 A | 9/2003 |
| JP | 2005-086866 A | 3/2005 |
| JP | 2005-218155 A | 8/2005 |
| JP | 2005-245185 A | 9/2005 |
| JP | 2006-158084 A | 6/2006 |
| JP | 2011-188607 A | 9/2011 |
| JP | 3171633 U | 11/2011 |
| JP | 2012-134152 A | 7/2012 |
| JP | 2012-170258 A | 9/2012 |
| WO | 2012/086645 A1 | 6/2012 |
| WO | 2012/127649 A1 | 9/2012 |

* cited by examiner

ELECTRIC POWER SYSTEM PROTECTION DEVICE, ELECTRIC PATH SWITCHING DEVICE, AND ELECTRIC POWER SUPPLY SYSTEM

RELATED APPLICATIONS

This application is the U.S. National Phase under 35 U.S.C. § 371 of International Application No. PCT/JP2014/001331, filed on Mar. 10, 2014 which in turn claims the benefit of Japanese Patent Application No. 2013-076433 filed on Apr. 1, 2013, the disclosures of which applications are incorporated by reference herein.

TECHNICAL FIELD

The present invention relates to electric power system protection devices, electric path switching devices, and electric power supply systems.

BACKGROUND ART

There has been examined supplying electric power temporarily from electric vehicles incorporating secondary batteries, when electricity infrastructures become unavailable due to disaster or the like. In more details, an electric vehicle such as an electric drive vehicle (EV) and a plug-in hybrid drive vehicle (PHEV) is connected to an electric power wiring system (hereinafter referred to as "indoor wiring system") installed in a facility such as a residence, a factory, and an office, and then electric power is supplied from the secondary battery in the electric vehicle to the indoor wiring system. This indoor wiring system normally receives commercial electric power from the commercial electric power system.

For example, in supplying electric power from the secondary battery in the electric vehicle to the indoor wiring system such as HEMS (Home Energy Management System), electric power discharged from the secondary battery to the indoor wiring system is controlled by use of a charging stand provided between a charge and discharge device incorporated in the electric vehicle and the indoor wiring system. This charging stand includes an electric leakage detector on an electric path from the electric vehicle to the indoor wiring system. When electric leakage is detected, the charging stand breaks the electric path from the electric vehicle to the indoor wiring system (e.g., see document 1 [JP 2012-170258 A]).

Rules for interconnecting electric vehicles incorporating secondary batteries (external power supplies) and the commercial power supply system have not been determined yet. In consideration of protection of the electric power system, it is required that output current from the external power supply do not give direct effects on the commercial power supply system. Also in consideration of protection of the charge and discharge device incorporated in the electric vehicle, it is preferable that current outputted from the commercial power supply system do not give direct effects on the charge and discharge device in the electric vehicle.

SUMMARY OF INVENTION

In view of the above insufficiency, the present invention has aimed to propose an electric power system protection device, an electric path switching device, and an electric power supply system which are capable of minimizing effects on one of the external power supply and the commercial electric power system caused by electric failure occurring in the other.

The electric power system protection device of the first aspect according to the present invention includes a transformer including a primary winding and a secondary winding which are electrically isolated from each other. The primary winding is to be connected to a first electric path which is to be connected to an external power supply configured to supply AC power by use of a secondary battery, so as to receive the AC power from the external power supply. The secondary winding is to be connected to a second electric path to be connected to a power supply path from a commercial electric power system to an electric load.

In the electric power system protection device of the second aspect according to the present invention, realized in combination with the first aspect, the electric power system protection device further includes a first electric leakage detector, a second electric leakage detector, and first and second ground parts. The first electric leakage detector is provided to the first electric path and configured to detect electric leakage from the first electric path. The second electric leakage detector is provided to the second electric path and configured to detect electric leakage from the second electric path. The first ground part and the second ground part are to be grounded. The first ground part is connected to a part, between the primary winding and the first electric leakage detector, of the first electric path. The second ground part is connected to a part, between the secondary winding and the second electric leakage detector, of the second electric path.

In the electric power system protection device of the third aspect according to the present invention, realized in combination with the second aspect, the electric power system protection device further includes a resistor. The first ground part is connected to the first electric path through the resistor.

In the electric power system protection device of the fourth aspect according to the present invention, realized in combination with the first aspect, the electric power system protection device further includes a first electric leakage detector, a second electric leakage detector, first and second ground parts, a first resistor, and a second resistor. The first electric leakage detector is configured to detect electric leakage from the first electric path. The second electric leakage detector is provided to the second electric path and configured to detect electric leakage from the second electric path. The first ground part and a second ground part are to be grounded. The first end of the first resistor is connected to a first voltage line of a pair of voltage lines constituting the first electric path. The first end of the second resistor is connected to a second voltage line of the pair of voltage lines. The second end of the first resistor and the second end of the second resistor are interconnected. The first ground part is connected to a connection point of the second end of the first resistor and the second end of the second resistor. The second ground part is connected to a part, between the secondary winding and the second electric leakage detector, of the second electric path. The first electric leakage detector is configured to detect electric leakage from the first electric path on a basis of current flowing through the connection point.

In the electric power system protection device of the fifth aspect according to the present invention, realized in combination with any one of the second to fourth aspects, the electric power system protection device further includes a first breaker. The first breaker is configured to interrupt supply of electric power from the external power supply to the electric load when the first electric leakage detector detects electric leakage from the first electric path or when the second electric leakage detector detects electric leakage from the second electric path.

In the electric power system protection device of the sixth aspect according to the present invention, realized in combination with any one of the first to fifth aspects, the electric power system protection device further includes a first overcurrent detector and a second overcurrent detector. The first overcurrent detector is configured to determine occurrence of overcurrent in the first electric path when a value of current flowing through the first electric path is greater than a first threshold value. The second overcurrent detector is configured to determine occurrence of overcurrent in the second electric path when a value of current flowing through the second electric path is greater than a second threshold value.

In the electric power system protection device of the seventh aspect according to the present invention, realized in combination with the sixth aspect, the electric power system protection device further includes a second breaker. The second breaker is configured to interrupt supply of electric power from the external power supply to the electric load when the first overcurrent detector determines occurrence of overcurrent in the first electric path or when the second overcurrent detector determines occurrence of overcurrent in the second electric path.

In the electric power system protection device of the eighth aspect according to the present invention, realized in combination with any one of the first to seventh aspects, the electric power system protection device further includes: an overvoltage detector configured to detect overvoltage at the first electric path; and a third breaker configured to interrupt supply of electric power from the external power supply to the electric load when the overvoltage detector detects the overvoltage.

In the electric power system protection device of the ninth aspect according to the present invention, realized in combination with any one of the first to seventh aspects, the electric power system protection device further includes an overvoltage breaker configured to interrupt supply of electric power from the external power supply to the electric load when voltage at the first electric path becomes overvoltage.

In the electric power system protection device of the tenth aspect according to the present invention, realized in combination with any one of the first to ninth aspects, the electric power system protection device further includes: an undervoltage detector configured to detect undervoltage at the first electric path; and a fourth breaker configured to interrupt supply of electric power from the external power supply to the electric load when the undervoltage detector detects the undervoltage.

In the electric power system protection device of the eleventh aspect according to the present invention, realized in combination with any one of the first to ninth aspects, the electric power system protection device further includes an undervoltage breaker configured to interrupt supply of electric power from the external power supply to the electric load when voltage at the first electric path becomes undervoltage.

The electric path switching device of the twelfth aspect according to the present invention includes a switching circuit. The switching circuit includes a first terminal, a second terminal, and a third terminal. The first terminal is to be connected to a third electric path to be connected to an electric load. The second terminal is to be connected to a fourth electric path to be connected to a commercial electric power system. The third terminal is to be connected to the electric power system protection device according to any one of the first to eleventh aspects. The switching circuit is configured to connect the first terminal to either one of the second terminal and the third terminal.

In the electric path switching device of the thirteenth aspect according to the present invention, realized in combination with the twelfth aspect, the switching circuit is configured to, when the commercial electric power system is available, connect the first terminal to the second terminal. The switching circuit is configured to, when the commercial electric power system is unavailable, connect the first terminal to the third terminal.

In the electric path switching device of the fourteenth aspect according to the present invention, realized in combination with the twelfth or thirteenth aspect, the electric path switching device further includes a control circuit. The control circuit is configured to, when the commercial electric power system is available, control the switching circuit so as to connect the first terminal to the second terminal. The control circuit is configured to, when the commercial electric power system is unavailable, control the switching circuit so as to connect the first terminal to the third terminal.

The electric power supply system of the fifteenth aspect according to the present invention includes: the electric power system protection device according to any one of the first to eleventh aspects; and the electric path switching device according to any one of the twelfth to fourteenth aspects.

DESCRIPTION OF EMBODIMENTS

1. Configurations

1.1 Basic Example

Figure 1:
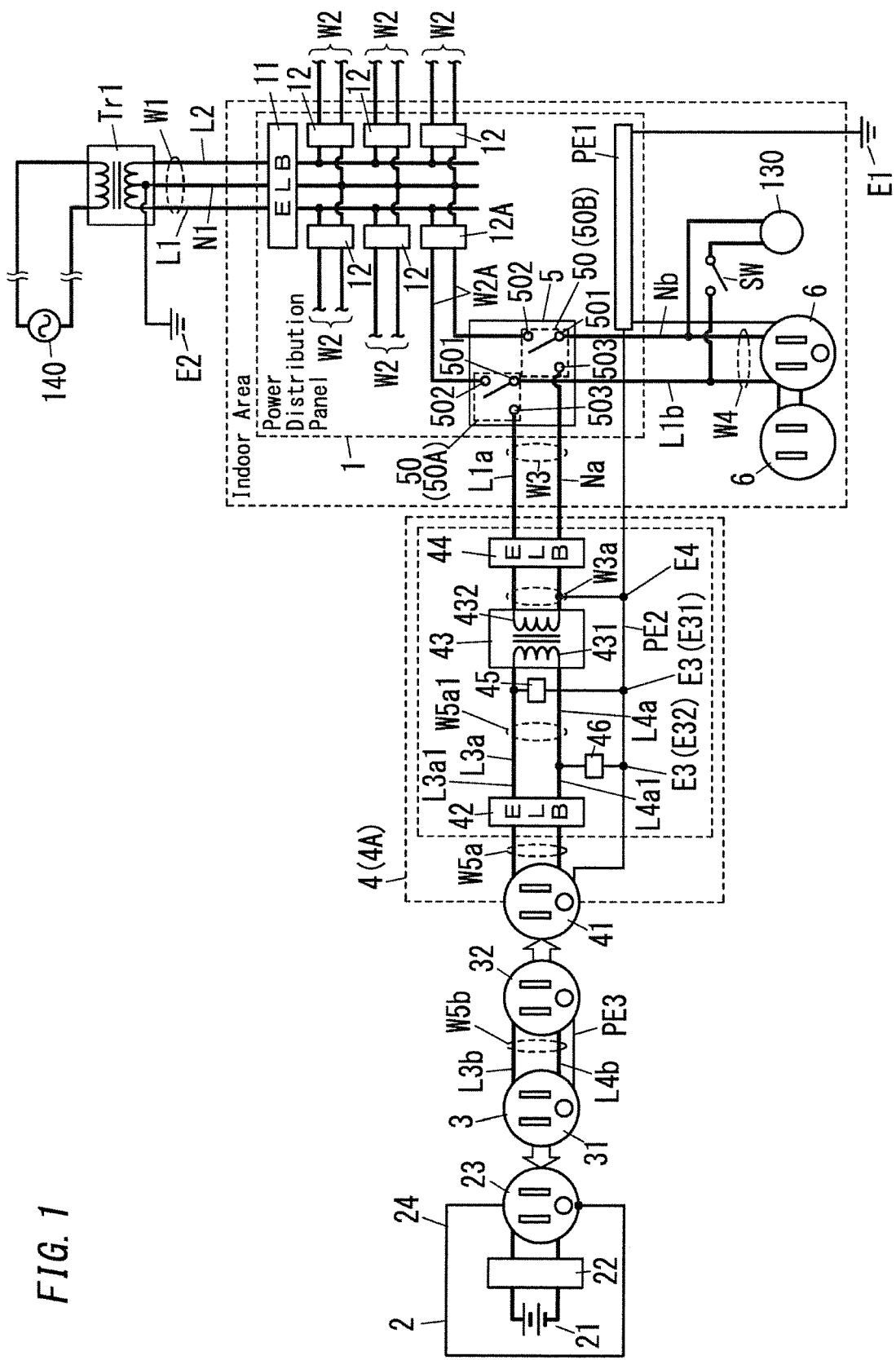
FIG. 1 is a circuit diagram illustrating a configuration of an electric power supply system of a basic example of one embodiment according to the present invention.

The electric power supply system of the present embodiment has a configuration shown in FIG. 1, and is to be used in a facility to receive commercial electric power supplied by an electric company.

The electric power supply system of the present embodiment includes main components which are a power distribution panel 1, an external power supply 2, a connection cable 3, an electric power system protection device 4 (4A), and an electric path switching device 5.

Drawn into a facility such as a residence, a factory, and an office, is a trunk line W1 connected to a secondary side of a pole transformer Tr1. Commercial electric power is supplied to the facility through the trunk line W1. The trunk line W1 is connected to multiple branch lines W2 by the power distribution panel 1.

The trunk line W1 is adapted to a single-phase three-wire 200V/100V system, and includes two voltage lines (first electric wires) L1 and L2 and a neutral line (second electric wire) N1. Further, on the secondary side of the pole transformer Tr1, the neutral line N1 is connected to a B-type ground E2. Note that, an electric power system to supply commercial electric power through the trunk line W1 and the branch lines W2 is referred to as a commercial electric power system 140 (see FIG. 1).

The power distribution panel 1 includes a main electric leakage breaker 11 interposed in the trunk line W1, and a secondary side of the main electric leakage breaker 11 is connected to the branch lines W2 through individual multiple branch breakers 12. Each branch line W2 receives any one of voltage of 200 V between the voltage line L1 and the voltage line L2, voltage of 100 V between the voltage line L1 and the neutral line N1, and voltage of 100 V between the voltage line L2 and the neutral line N1, and supplies AC power to an electric load not shown.

The branch line W2 (hereinafter, referred to as "branch line W2A") connected to the secondary side of a particular one of the branch breakers 12 (hereinafter, referred to as "branch breaker 12A") is connected to the electric path switching device 5 included in the power distribution panel 1. The branch line W2A includes lines respectively connected to the voltage line L1 and the neutral line N1.

The electric path switching device 5 includes a switch (switching circuit) 50 configured to connect an emergency electric path W4 (third electric path) to either one of the branch line W2A (fourth electric path) and a secondary electric path W3 (second electric path).

The emergency electric path W4 includes a voltage line (first electric wire) L1b and a neutral line (second electric wire) Nb. There are emergency outlets 6 and an electric load (emergency load) 130 connected between the voltage line L1b and the neutral line Nb.

The emergency load 130 is an electric appliance to be operated in response to a failure of commercial power supply, and may be exemplified by lighting devices, air conditioners, and the like. The emergency load 130 may be directly connected to the voltage line L1b and the neutral line Nb, or may be connected to the voltage line L1b and the neutral line Nb through the emergency outlet 6. Whether the emergency load 130 is started or stopped (turned on or off) may be selected by a switch SW connected in series with the emergency load 130.

The secondary electric path W3 includes a voltage line (first electric wire) L1a and a neutral line (second electric wire) Na, and receives external electric power from the external power supply 2 through the connection cable 3 and the electric power system protection device 4. The secondary electric path W3 supplies the external electric power to the emergency outlets 6 and the emergency load 130 connected to the emergency electric path W4, through the electric path switching device 5.

In more details, the electric path switching device 5 connects a set of the voltage line L1b and the neutral line Nb of the emergency electric path W4 to either one of a set of the voltage line L1 and the neutral line N1 of the branch line W2A and a set of the voltage line L1a and the neutral line Na of the secondary electric path W3.

The electric path switching device 5 includes the switching circuit (switch) 50. The switching circuit 50 includes a first terminal 501 to be connected to the emergency electric path (third electric path) W4, a second terminal 502 to be connected to the branch electric path (fourth electric path) W2A, and a third terminal 503 to be connected to a secondary electric path (second electric path) W3. The switching circuit 50 is configured to connect the first terminal 501 to either one of the second terminal 502 and the third terminal 503.

In the present embodiment, the electric path switching device 5 includes two switching circuits 50 (50A and 50B). The first terminal 501 of the switching circuit 50A is connected to the voltage line L1b of the emergency electric path W4, and the first terminal 501 of the switching circuit 50B is connected to the neutral line Nb of the emergency electric path W4. The second terminal 502 of the switching circuit 50A is connected to the voltage line L1 of the branch line W2A, and the second terminal 502 of the switching circuit 50B is connected to the neutral line N1 of the branch line W2A. The third terminal 503 of the switching circuit 50A is connected to the voltage line L1a of the secondary electric path W3, and the third terminal 503 of the switching circuit 50B is connected to the neutral line Na of the secondary electric path W3.

Further, the power distribution panel 1 includes a protective ground conductor PE1. The protective ground conductor PE1 is grounded by a D-type ground E1. Further, if the emergency outlet 6 is an outlet with a grounding electrode, the grounding electrode of the emergency outlet 6 is connected to the protective ground conductor PE1.

The external power supply 2 is mounted on an electric vehicle such as an electric drive vehicle (EV) and a plug-in hybrid electric drive vehicle (PHEV). The external power supply 2 includes a secondary battery 21, an inverter 22, and an outlet 23.

The inverter 22 is configured to convert DC voltage from the secondary battery 21 into AC and output the AC from the outlet 23 as external electric power. The inverter 22 may be an insulated inverter or a non-insulated inverter.

The outlet 23 is an outlet with a grounding electrode, and the grounding electrode of the outlet 23 is connected to a metal casing 24 of the external power supply 2.

As described above, the external power supply 2 is configured to supply AC power by use of the secondary battery 21.

The electric power system protection device 4 includes an inlet 41, an electric leakage breaker 42 (a first electric leakage detector), a transformer 43, an electric leakage breaker 44 (a second electric leakage detector), resistors 45 and 46, and a protective ground conductor PE2.

The transformer 43 includes a primary winding 431 and a secondary winding 432 which are electrically isolated from each other. Further, the primary winding 431 and the secondary winding 432 are magnetically coupled with each other.

The primary winding 431 of the transformer 43 has both ends connected to a primary electric path W5a (a first electric path). The primary electric path W5a includes voltage lines (a first electric wire and a second electric wire) L3a and L4a, and the voltage line L3a is connected to a first end of the primary winding 431, and the voltage line L4a is connected to a second end of the primary winding 431. In short, the primary winding 431 is connected between the voltage lines L3a and L4a in a pair.

The voltage lines L3a and L4a are connected to respective voltage electrodes of the inlet 41 through the electric leakage breaker 42.

Further, the secondary winding 432 of the transformer 43 has both ends respectively connected to the voltage line L1a and the neutral line Na of the secondary electric path W3 through the electric leakage breaker 44. In more detail, the voltage line L1a is connected to a first end of the secondary winding 432, and the neutral line Na is connected to a second end of the secondary winding 432. In short, the secondary winding 432 is connected between the voltage line L1a and the neutral line Na.

Further, the protective ground conductor PE2 of the electric power system protection device 4 is electrically connected to the protective ground conductor PE1 of the power distribution panel 1.

The inlet 41 is an inlet with a grounding electrode, and the grounding electrode of the inlet 41 is connected to the protective ground conductor PE2.

Further, the electric power system protection device 4 includes first and second ground parts E3 and E4. The first and second ground parts E3 and E4 are provided to the protective ground conductor PE2. In short, the first and second ground parts E3 and E4 are grounded respectively.

The first ground part E3 is connected to a part W5a1, between the primary winding 431 and the electric leakage breaker (first electric leakage detector) 42, of the primary electric path (first electric path) W5a.

The first ground part E3 includes two ground parts E31 and E32. The ground part E31 is connected to a part L3a1, between the primary winding 431 and the electric leakage breaker (first electric leakage detector) 42, of the voltage line L3a. The ground part E32 is connected to a part L4a1, between the primary winding 431 and the electric leakage breaker (first electric leakage detector) 42, of the voltage line L4a.

Further, the first ground part E3 is connected to the first electric path W5a through resistors (the resistors 45 and 46). In more details, the ground part E31 is connected to the voltage line L3a through the resistor 45, and the ground part E32 is connected to the voltage line L4a through the resistor 46.

The second ground part E4 is connected to a part W3a, between the secondary winding 432 and the electric leakage breaker 44 (the second electric leakage detector) 44, of the secondary electric path (second electric path) W3.

As described above, the electric power system protection device 4 includes the ground parts E31 and E32 (the first ground part) connecting part of the primary electric path W5a between the primary winding 431 and the electric leakage breaker 42 to the protective ground conductor PE2.

Further, the electric power system protection device 4 includes the ground part E4 (the second ground part) connecting part of the secondary electric path W3 between the secondary winding 432 and the electric leakage breaker 44 to the protective ground conductor PE2.

In more details, the ground part E31 interconnects the voltage line L3a and the protective ground conductor PE2 through the resistor 45. The ground part E32 interconnects the voltage line L4a and the protective ground conductor PE2 through the resistor 46.

The ground part E4 interconnects the neutral line Na and the protective ground conductor PE2 directly.

Note that, the resistors 45 and 46 have relatively high resistances, and therefore grounding by the ground parts E31 and E32 is high resistance grounding.

The external power supply 2 and the electric power system protection device 4 are interconnected by the connection cable 3.

The connection cable 3 includes a plug 31 at one end and a plug 32 at the other end. The plug 31 and the plug 32 are interconnected by a cable serving as the primary electric path W5b (the first electric path).

The primary electric path W5b is constituted by voltage lines L3b and L4b, and a protective ground conductor PE3.

Each of the plugs 31 and 32 is a plug with a grounding electrode, voltage electrodes of the plug 31 are connected to voltage electrodes of the plug 32 through the voltage lines L3b and L4b, respectively. The grounding electrode of the plug 31 and the grounding electrode of the plug 32 are interconnected by the protective ground conductor PE3.

While the plug 31 is connected to the outlet 23 of the external power supply 2 and the plug 32 is connected to the inlet 41 of the electric power system protection device 4, AC voltage outputted from the external power supply 2 is applied between the both ends of the primary winding 431 of the transformer 43 through the connection cable 3. Thus, the first electric path (W5a, W5b) is connected to the external power supply 2 and receives AC power from the external power supply 2. AC power received by the first electric path (W5a, W5b) is given to the primary winding 431.

When AC voltage is applied across the primary winding 431, inductive voltage is generated between the both ends of the secondary winding 432. Therefore, external electric power is transferred from the primary side to the secondary side of the transformer 43.

In a normal state in which the commercial electric power is supplied through the trunk line W1 (in other words, the commercial electric power system 140 is available), the electric path switching device 5 connects the emergency electric path W4 to the branch line W2A. Therefore, commercial electric power is supplied from the commercial electric power system to the emergency outlets 6 and the emergency load 130 through the branch line W2A.

In contrast, in an electric fault state in which the commercial electric power is not supplied (in other words, the commercial electric power system 140 is unavailable), the electric path switching device 5 connects the emergency electric path W4 to the secondary electric path W3. Therefore, the external electric power generated by the external power supply 2 is supplied to the emergency outlets 6 and the emergency load 130 through the secondary electric path W3.

In summary, while the commercial electric power system 140 is available, the switching circuit 50 connects the first terminal 501 to the second terminal 502. While the commercial electric power system 140 is unavailable, the switching circuit 50 connects the first terminal 501 to the third terminal 503.

Note that, switching of electric paths by the electric path switching device 5 may be conducted by manual operation of users, or conducted automatically based on detection results of conduction or electric fault states of the commercial electric power.

In summary, the switching circuit 50 may be configured to connect the first terminal 501 to either one of the second terminal 502 and the third terminal 503 in accordance with user's manual operation.

When the commercial electric power system 140 is available, a user operates the switching circuit 50 so that the first terminal 501 is connected to the second terminal 502. Thus, while the commercial electric power system 140 is available, the switching circuit 50 connects the first terminal 501 to the second terminal 502. Or, when the commercial electric power system 140 is unavailable, a user operates the switching circuit 50 so that the first terminal 501 is connected to the third terminal 503. Thus, while the commercial electric power system 140 is unavailable, the switching circuit 50 connects the first terminal 501 to the third terminal 503.

Figure 4:
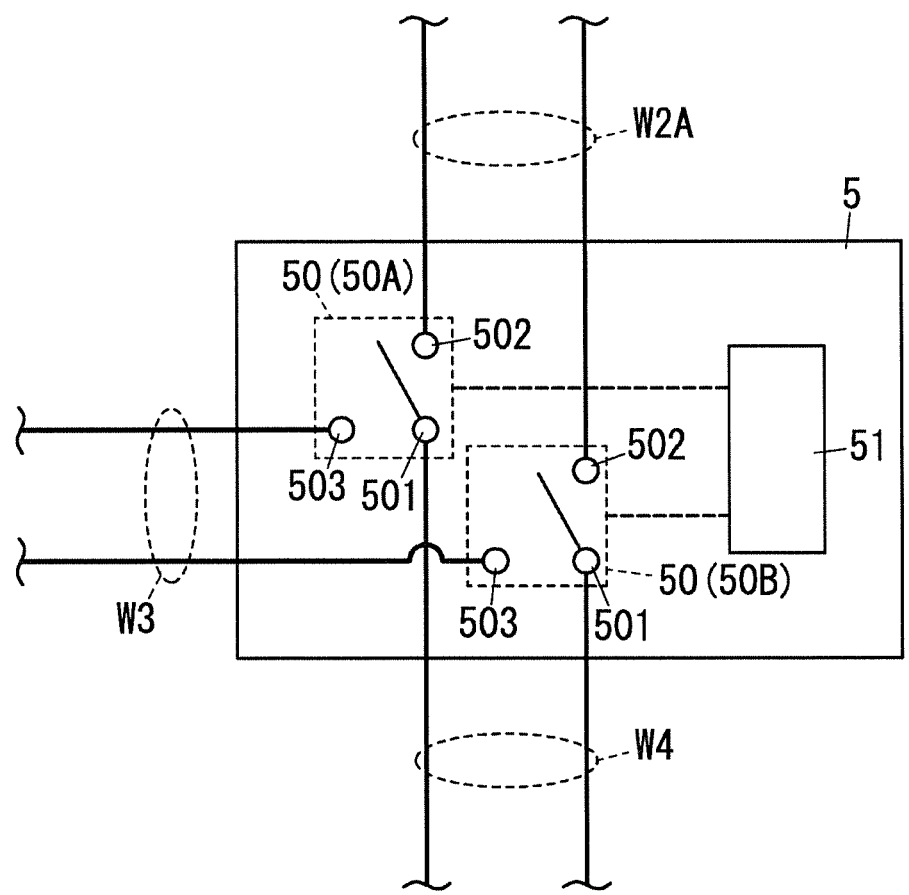
FIG. 4 is a schematic circuit diagram illustrating another example of an electric path switching device in the electric power supply system of the basic example.

Alternatively, the switching circuit 50 may be configured to connect the first terminal 501 to either one of the second terminal 502 and the third terminal 503 automatically. In this case, as shown in FIG. 4, the switching circuit 50 includes a control circuit 51. The control circuit 51 is configured to, when the commercial electric power system 140 is available, control the switching circuit 50 so as to connect the first terminal 501 to the second terminal 502. The control circuit 51 is configured to, when the commercial electric power system 140 is unavailable, control the switching circuit 50 so as to connect the first terminal 501 to the third terminal 503.

Note that, the electric path switching device 5 may be housed in a casing of the power distribution panel 1, or be set in a different place from the power distribution panel 1.

In summary, with regard to the electric path between the external power supply 2 and the emergency load 130, the primary electric path W5a and the secondary electric path W3 are isolated electrically by the transformer 43 of the electric power system protection device 4.

As a result, the commercial electric power system 140 is not influenced directly by current outputted from the external power supply 2. Further, the external power supply 2 is not influenced directly by current supplied from the commercial electric power system 140. Hence, the external power supply 2 can be protected.

Thus, the electric power system protection device 4 is provided, and therefore, even if electric failure occurs in one of the external power supply 2 and the commercial electric power system 140, effects on the other caused by such electric failure can be minimized.

Further, the secondary electric path W3 to receive the external electric power and the branch line W2A to receive the commercial electric power are mechanically isolated from each other by the electric path switching device 5.

Thus, by providing the electric path switching device 5, effects on one of the external power supply 2 and the commercial electric power system 140 caused by the other can be reduced. Therefore, even if electric failure occurs in one of the external power supply 2 and the commercial electric power system 140, effects on the other caused by such electric failure can be minimized.

Figure 12:
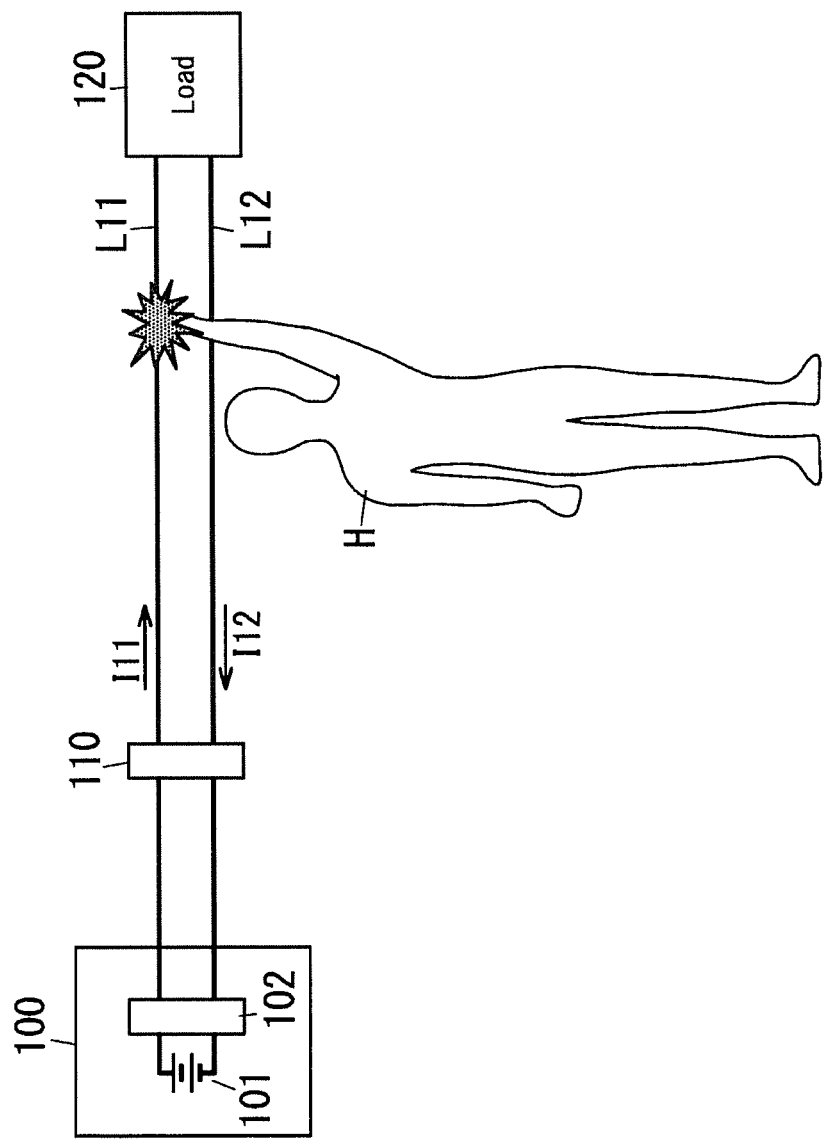
FIG. 12 is a schematic circuit diagram illustrating a conventional system being in an electric leakage state.
Figure 13:
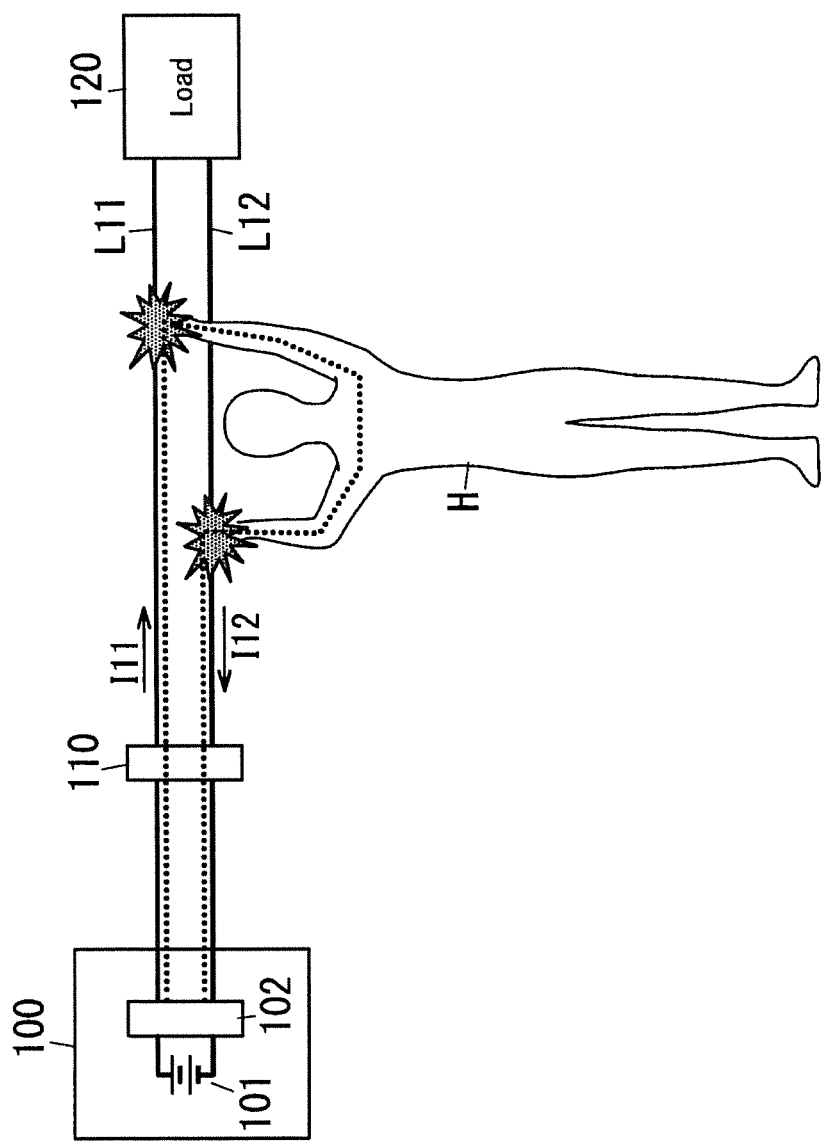
FIG. 13 is a schematic circuit diagram illustrating the conventional system being in another electric leakage state.
Figure 14:
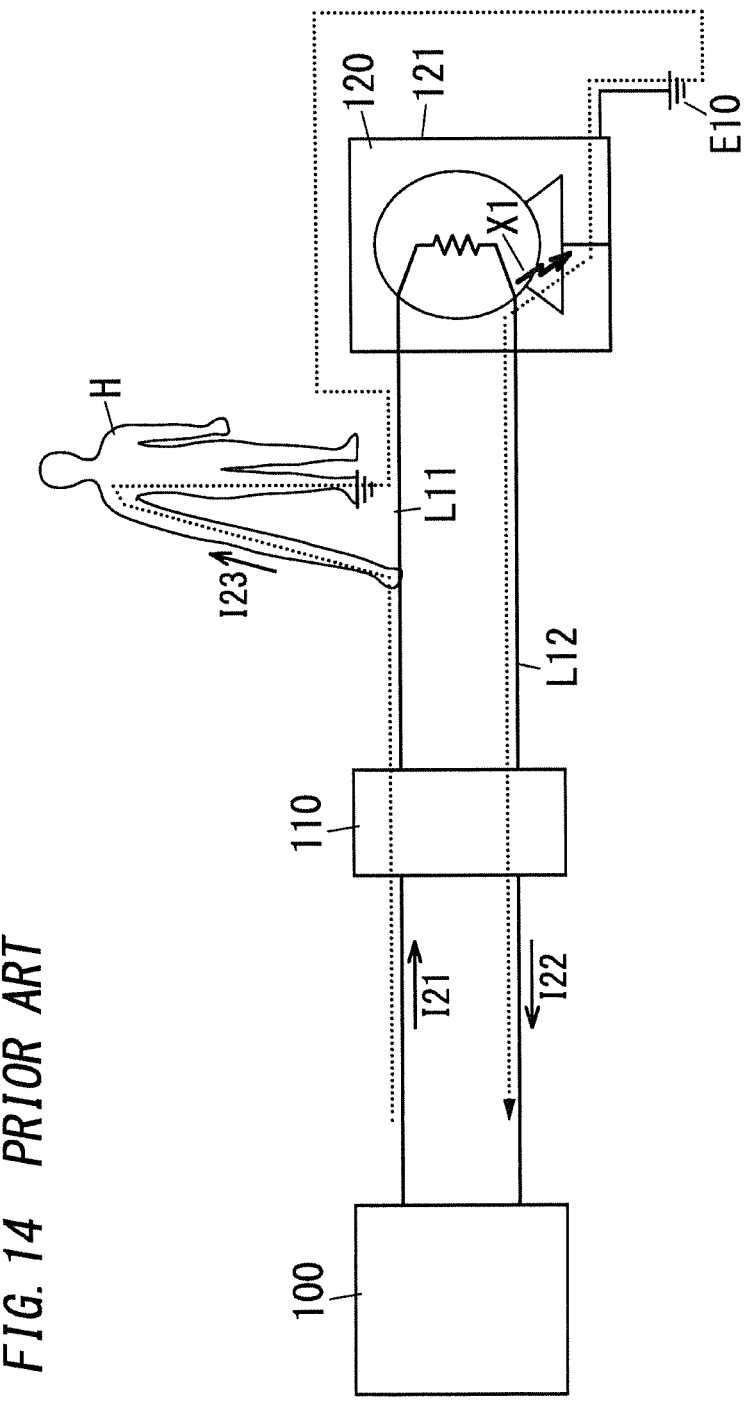
FIG. 14 is a schematic circuit diagram illustrating another conventional system being in an electric leakage state.

FIG. 12 to FIG. 14 show schematic configurations of conventional systems.

An external power supply 100 is mounted on an electric vehicle, and includes a secondary battery 101 and an inverter 102. The inverter 102 converts DC voltage from the secondary battery 101 into AC voltage, and applies the AC voltage between the voltage line L11 and the voltage line L12. An electric load 120 is connected between the voltage line L11 and the voltage line L12, and thus operates with the external electric power outputted from the external power supply 100.

As shown in FIG. 12, when a user H touches the voltage line L11, ground fault current does not flow because the voltage lines L11 and L12 are not grounded. Therefore, even if the electric leakage breaker 110 is provided to the voltage lines L11 and L12, current I11 flowing through the voltage line L11 is equivalent to current I12 flowing through the voltage line L12, and hence the electric leakage breaker 110 fails to detect electric leakage.

Alternatively, as shown in FIG. 13, also when the user H touches both of the voltage lines L11 and L12, ground fault current does not flow because the voltage lines L11 and L12 are not grounded. Therefore, even if the electric leakage breaker 110 is provided to the voltage lines L11 and L12, current I11 flowing through the voltage line L11 is equivalent to current I12 flowing through the voltage line L12, and hence the electric leakage breaker 110 fails to detect electric leakage.

FIG. 14 shows the system in which a casing 121 of the electric load 120 connected between the voltage lines L11 and L12 is grounded by the ground part E10.

While insulation breakdown occurs at a point X1 of the electric load 120, when the user H touches the voltage line L11 between the electric leakage breaker 110 and the electric load 120, ground fault current I23 flows through the external power supply 100, the voltage line L11, the user H, the ground part E10, the electric load 120, the voltage line L12, and the external power supply 100, in this order.

However, the ground fault current I23 flows through a closed loop including the voltage lines L11 and L12. Therefore, currents I21 and I22 respectively flowing through the voltage lines L11 and L12 where the electric leakage breaker 110 is provided are equivalent to each other. Consequently, the electric leakage breaker 110 fails to detect electric leakage.

Figure 15:
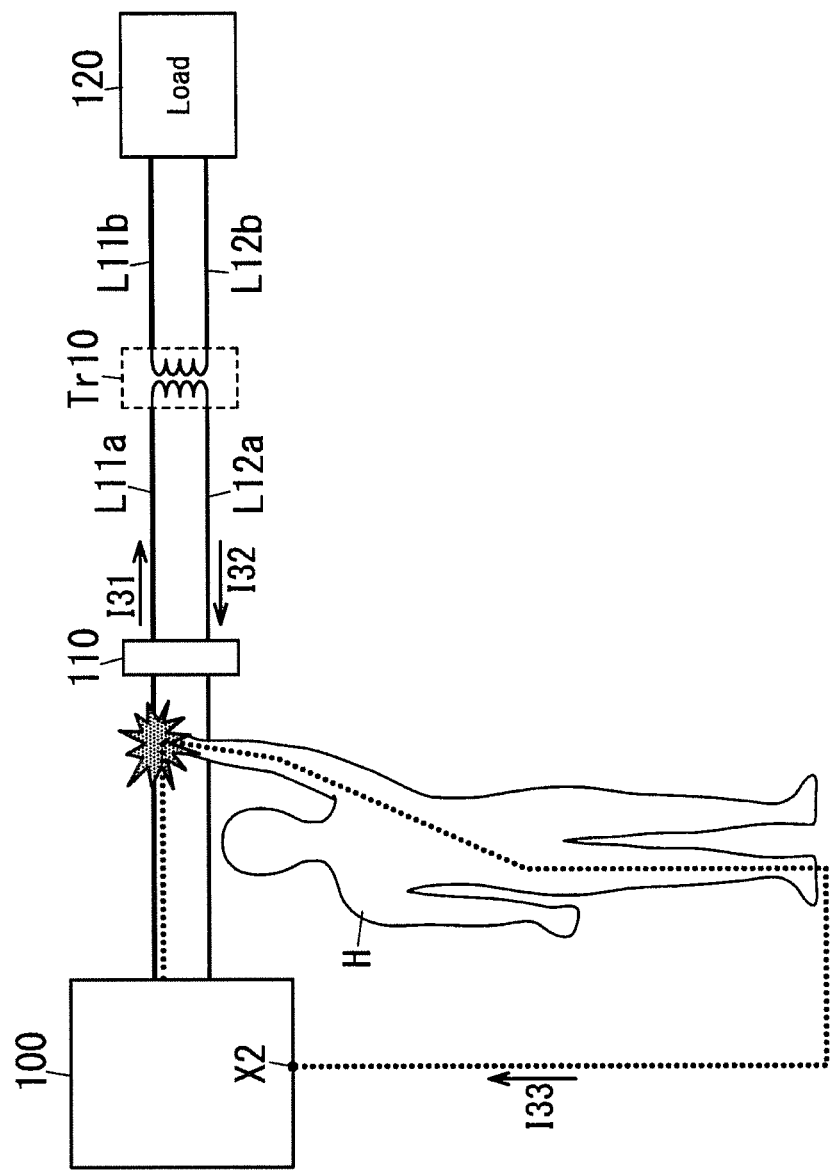
FIG. 15 is a schematic circuit diagram illustrating another conventional system being in an electric leakage state.

Alternatively, as shown in FIG. 15, the voltage lines Li1a and L12a are connected to a primary side of a transformer Tr10, and the voltage lines L11b and L12b are connected to a secondary side of the transformer Tr10, and the electric load 120 is connected between the voltage lines L11b and L12b.

The electric vehicle including the external power supply 100 is in contact with the ground surface through tires. For this reason, a circuit between the external power supply 100 and the transformer Tr10 is closed. Hence, even if insulation breakdown occurs in the circuit between the external power supply 100 and the transformer Tr10, no ground fault current flows.

However, while insulation breakdown occurs at a point X2 of the external power supply 100, when the user H touches the voltage line L11a, ground fault current I33 flows through the user H. In this case, the ground fault current I31 returns to the external power supply 100 by way of the user H and the point X2, and currents I31 and I32 respectively flowing through the voltage lines L11*a* and L12*a* where the electric leakage breaker 110 is provided are equivalent to each other. Hence, the electric leakage breaker 110 fails to detect electric leakage.

Additionally, electric leakage on the primary side of the transformer Tr10 cannot be detected by a device on the secondary side of the transformer Tr10, and electric leakage on the secondary side of the transformer Tr10 cannot be detected by a device on the primary side of the transformer Tr10.

In view of this, the present embodiment includes the electric leakage breakers 42 and 44 on the primary side and the secondary side of the transformer 43 respectively, and further includes the ground parts E31, E32, and E4.

Figure 2:
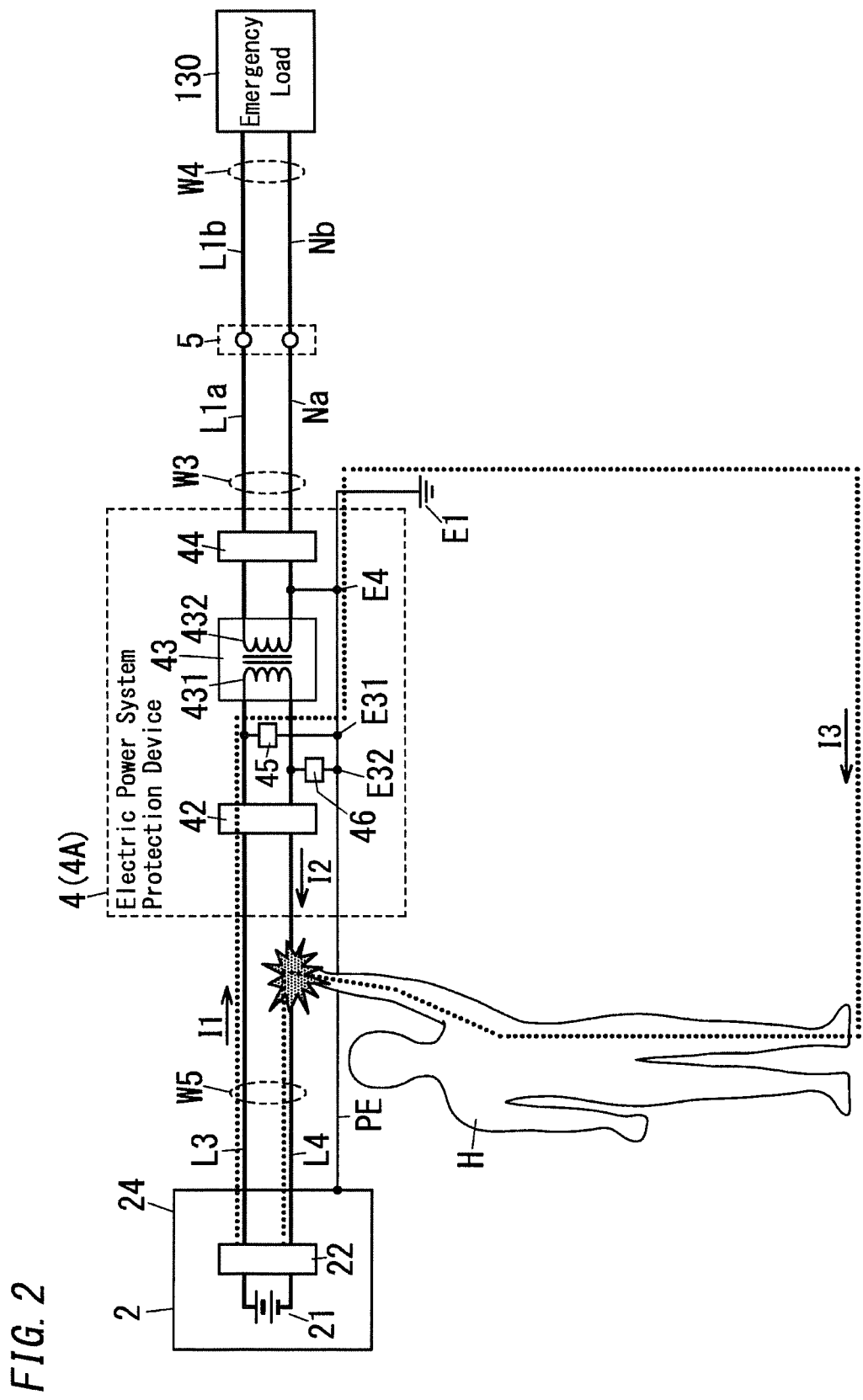
FIG. 2 is a schematic circuit diagram illustrating the electric power supply system of the basic example being in an electric leakage state.
Figure 3:
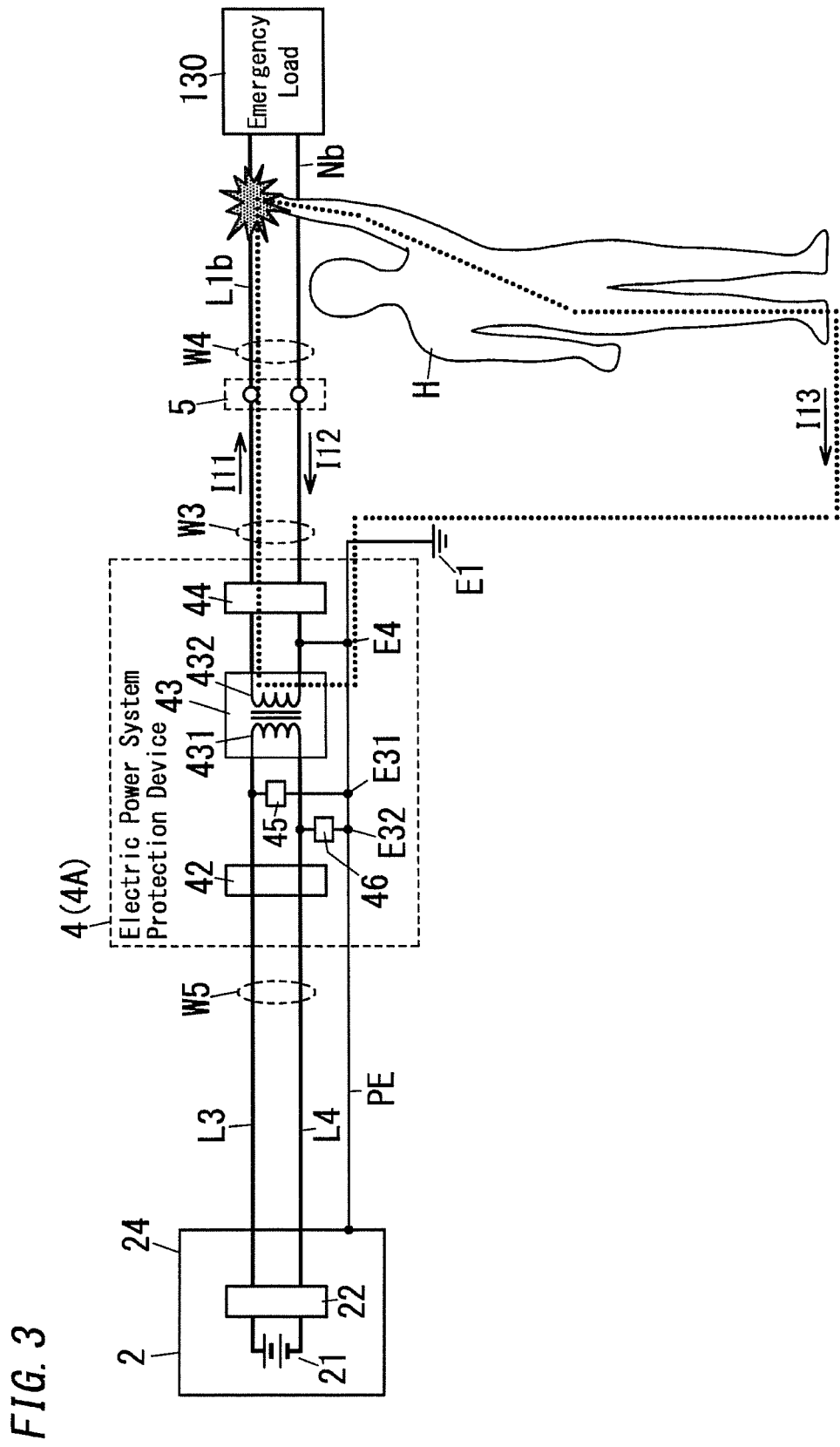
FIG. 3 is a schematic circuit diagram illustrating the electric power supply system of the basic example being in another electric leakage state.

The following explanation referring to FIG. 2 and FIG. 3 is made to operation in response to electric leakage from the electric path between the external power supply 2 and the emergency load 130 shown in FIG. 1. Note that, FIG. 2 and FIG. 3 show schematic circuit diagrams of the electric power supply system in which the electric path switching device 5 connects the emergency electric path W4 to the secondary electric path W3.

The connection cable 3 is connected to the electric power system protection device 4, and thereby the primary electric paths W5*a* and W5*b* are interconnected. In more details, the voltage lines L3*a* and L3*b* are interconnected, and the voltage lines L4*a* and L4*b* are interconnected. In view of this, in FIG. 2 and FIG. 3, the primary electric paths W5*a* and W5*b* are collectively illustrated as the primary electric path W5, and the voltage lines L3*a* and L3*b* are collectively illustrated as the voltage line L3, and the voltage lines L4*a* and L4*b* are collectively illustrated as the voltage line L4.

Further, the external power supply 2 and the electric power system protection device 4 are interconnected by the connection cable 3, and thereby the protective ground conductors PE1, PE2, and PE3 are interconnected electrically. In view of this, in FIG. 2 and FIG. 3, the protective ground conductors PE1, PE2, and PE3 are collectively illustrated as a protective ground conductor PE. The protective ground conductor PE is electrically connected to the casing 24 of the external power supply 2, and is grounded by the ground part E1.

First, as shown in FIG. 2, when the user H touches the voltage line L4 on the primary side of the transformer 43, ground fault current I3 flows through the external power supply 2, the voltage line L3, the resistor 45, the ground part E31, the protective ground conductor PE, the ground part E1, the user H, the voltage line L4, and the external power supply 2 in this order.

In this case, when current flowing through the voltage line L3 where the electric leakage breaker 42 is provided is represented by I1, current I2 flowing through the voltage line L4 where the electric leakage breaker 42 is provided is equal to I1-I3. Therefore, the currents I1 and I2 passing through the electric leakage breaker 42 are not equivalent to each other, and thus the electric leakage breaker 42 detects electric leakage and then trips to break the voltage lines L3 and L4.

Alternatively, as shown in FIG. 3, when the user H touches the voltage line L1*b* on the secondary side of the transformer 43, ground fault current I13 flows through the secondary winding 432 of the transformer 43, the voltage line L1*a*, the voltage line L1*b*, the user H, the ground part E1, the protective ground conductor PE, the ground part E4, the neutral line Na, and the secondary winding 432 in this order.

In this case, when current flowing through the voltage line L1*a* where the electric leakage breaker 44 is provided is represented by I11, current I12 flowing through the neutral line Na where the electric leakage breaker 44 is provided is equal to I11-I13. Therefore, the currents I11 and I12 passing through the electric leakage breaker 44 are not equivalent to each other, and thus the electric leakage breaker 44 detects electric leakage and then trips to break the voltage line L1*a* and the neutral line Na.

Thus, even if ground fault current occurs on either the primary side or the secondary side of the transformer 43, either the electric leakage breaker 42 or 44 detects electric leakage, and therefore supply of power from the external power supply 2 to the emergency load 130 can be interrupted.

As described above, the electric power system protection device 4 (4A) according to the basic example includes the transformer 43 including the primary winding 431 and the secondary winding 432 which are electrically isolated from each other. The primary winding 431 is to be connected to the first electric path (primary electric path) W5 (W5*a*, W5*b*) which is to be connected to the external power supply 2 configured to supply AC power by use of the secondary battery 21, so as to receive the AC power from the external power supply 2. The secondary winding 432 is to be connected to the second electric path (secondary electric path) W3 to be connected to the power supply path from the commercial electric power system 140 to an electric load (emergency load) 130.

Further, the electric power system protection device 4A of the basic example includes: the first electric leakage detector (electric leakage breaker) 42; the second electric leakage detector (electric leakage breaker) 44; and the first and second ground parts E3 and E4 which are to be grounded. The first electric leakage detector 42 is provided to the first electric path W5*a* and configured to detect electric leakage from the first electric path W5*a*. The second electric leakage detector 44 is provided to the second electric path W3 and is configured to detect electric leakage from the second electric path W3. The first ground part E3 is connected to the part W5*a*1, between the primary winding 431 and the first electric leakage detector 42, of the first electric path W5*a*. The second ground part E4 is connected to the part W3*a*, between the secondary winding 432 and the second electric leakage detector 44, of the second electric path W3.

Further, the electric power system protection device 4A of the basic example further includes a resistor (the resistors 45 and 46). The first ground part E3 is connected to the first electric path W5*a* through the resistor (the resistors 45 and 46).

Further, the electric power system protection device 4A of the basic example further includes the first breaker (the electric leakage breakers 42 and 44) configured to interrupt supply of electric power from the external power supply 2 to the electric load 130 when the first electric leakage detector 42 detects electric leakage from the first electric path W5*a* or when the second electric leakage detector 44 detects electric leakage from the second electric path W3.

Note that, in the basic example, the electric leakage breaker 42 functions as the first electric leakage detector and the first breaker. In contrast, the first electric leakage detector and the first breaker may be realized by individual devices. For example, the first electric leakage detector may be realized by an electric leakage detection circuit, and the first breaker may be realized by a circuit breaker.

Additionally, the electric leakage breaker 44 functions as the second electric leakage detector and the first breaker. In contrast, the second electric leakage detector and the first breaker may be realized by individual devices. For example, the second electric leakage detector may be realized by an electric leakage detection circuit, and the first breaker may be realized by a circuit breaker.

Therefore, with regard to the configuration in which the electric path between the external power supply 2 and the emergency load 130 is electrically divided by the transformer 43, it is possible to detect electric leakage on the primary side and the secondary side of the transformer 43 and break the electric path. Consequently, if electric leakage is caused by insulation breakdown at a indoor wiring system, insulation breakdown at electric vehicles, malfunction of the external power supply 2, abnormality at the connection cable 3 or the like, the electric path which may cause electric shock to the user H can be broken, and thus safety of users can be ensured.

Note that, breaking means for detecting electric leakage at the primary side and the secondary side of the transformer 43 and breaking electric paths may be one or more switches, relays, or the like.

1.2 Modified Example 1

Figure 5:
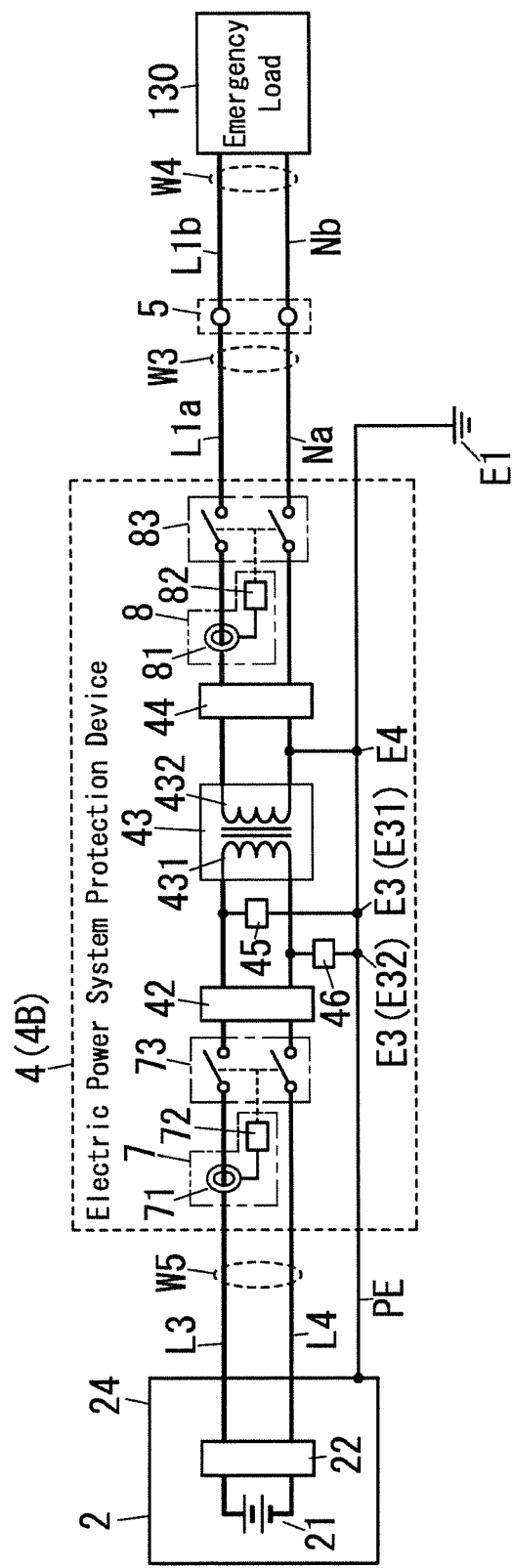
FIG. 5 is a schematic circuit diagram illustrating an electric power supply system of a modified example 1 of the above embodiment.

FIG. 5 shows the electric power supply system of the modified example 1 according to the present embodiment. As shown in FIG. 5, in the modified example 1, overvoltage detecting devices are provided to the primary side and the secondary side of the transformer 43. The overvoltage detecting device on the primary side includes an overcurrent detector 7 and a switch 73. The overvoltage detecting device on the secondary side includes an overcurrent detector 8 and a switch 83.

The overcurrent detector 7 (the first overcurrent detector) configured to detect overcurrent in the voltage line L3 is provided on the primary side of the transformer 43, and the switch 73 (the second breaker) is provided to the voltage lines L3 and L4.

The overcurrent detector 7 includes a current meter 71 and an overcurrent determiner 72.

The current meter 71 is configured to measure current in the voltage line L3.

The overcurrent determiner 72 is configured to determine whether a value of current in the voltage line L3 is greater than a threshold value K1 (a first threshold value), and determine occurrence of overcurrent when the value of current in the voltage line L3 is greater than the threshold value K1.

The overcurrent determiner 72 is configured to, when determining occurrence of overcurrent, turn off the switch 73 so as to interrupt supply of electric power from the external power supply 2 to the emergency load 130.

The overcurrent determiner 72 is configured to, until determining occurrence of overcurrent, keep the switch 73 on so as to continue supply of electric power from the external power supply 2 to the emergency load 130.

The overcurrent detector 8 (the second overcurrent detector) configured to detect overcurrent in the voltage line L1a is provided on the secondary side of the transformer 43, and the switch 83 (the second breaker) is provided to the voltage line L1a and the neutral line Na.

The overcurrent detector 8 includes a current meter 81 and an overcurrent determiner 82.

The current meter 81 is configured to measure current in the voltage line L1a.

The overcurrent determiner 82 is configured to determine whether a value of current in the voltage line L1a is greater than a threshold value K2 (a second threshold value), and determine occurrence of overcurrent when the value of current in the voltage line L1a is greater than the threshold value K2.

The overcurrent determiner 82 is configured to, when determining occurrence of overcurrent, turn off the switch 83 so as to interrupt supply of electric power from the external power supply 2 to the emergency load 130.

The overcurrent determiner 82 is configured to, until determining occurrence of overcurrent, keep the switch 83 on so as to continue supply of electric power from the external power supply 2 to the emergency load 130.

In summary, the electric power system protection device 4 (4B) of the modified example 1 further includes: the first overcurrent detector 7 configured to determine occurrence of overcurrent in the first electric path W5a when a value of current flowing through the primary electric path (first electric path) W5a is greater than the first threshold value K1; and the second overcurrent detector 8 configured to determine occurrence of overcurrent in the second electric path W3 when a value of current flowing through the secondary electric path (second electric path) W3 is greater than the second threshold value K2.

Further, the electric power system protection device 4 (4B) of the modified example 1 further includes the second breaker (the switches 73 and 83) configured to interrupt supply of electric power from the external power supply 2 to the electric load 130 when the first overcurrent detector 7 determines occurrence of overcurrent in the primary electric path (first electric path) W5a or when the second overcurrent detector 8 determines occurrence of overcurrent in the secondary electric path (second electric path) W3.

As described above, the modified example 1 breaks the electric path when the current supplied from the external power supply 2 becomes overcurrent, and hence safety can be more improved, and malfunction of the system caused by overcurrent can be suppressed.

1.3 Modified Example 2

Figure 6:
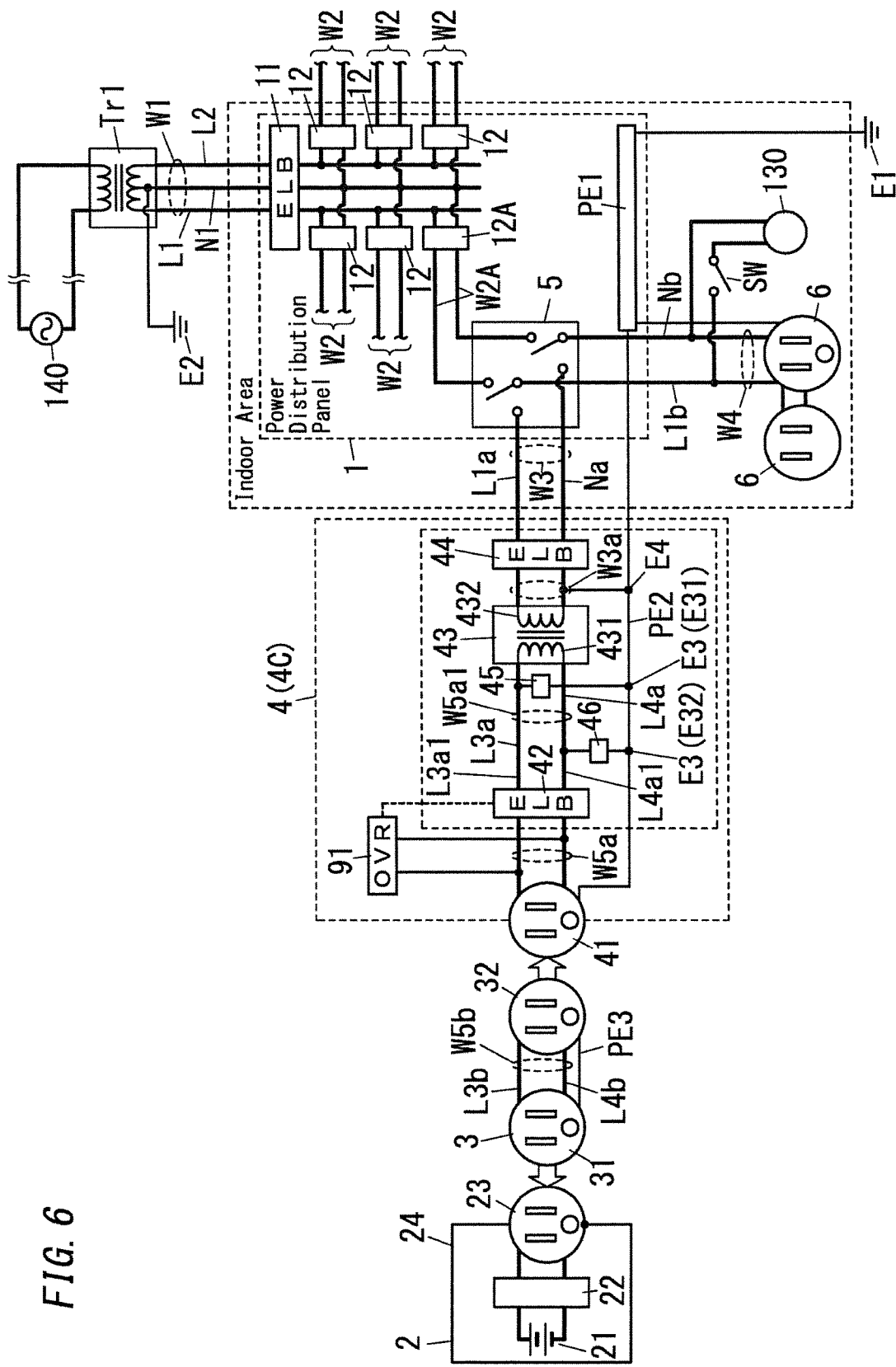
FIG. 6 is a circuit diagram illustrating an electric power supply system of a modified example 2 of the above embodiment.

FIG. 6 shows the electric power supply system of the modified example 2 according to the present embodiment. As shown in FIG. 6, the modified example 2 includes an overvoltage detector 91 configured to detect overvoltage between the voltage lines L3a and L4a of the primary electric path W5a (i.e., output voltage of the external power supply 2).

The electric leakage breaker 42 is an electric leakage breaker capable of being tripped by external signals. The overvoltage detector 91 is configured to, when a value of voltage between the voltage lines L3a and L4a becomes greater than a predetermined threshold value (third threshold value) K3, determine occurrence of overvoltage and send an external tripping signal to the electric leakage breaker 42. In short, the overvoltage detector 91 determines voltage with a value greater than the threshold value K3 to be overvoltage. For example, the threshold value K3 corresponds to a value of allowable voltage of the primary electric path W5a.

The electric leakage breaker 42 is configured to, in response to reception of the external tripping signal, trip to break the voltage lines L3a and L4a.

In summary, the electric power system protection device 4 (4C) of the modified example 2 includes: the overvoltage detector 91 configured to determine whether the voltage of the primary electric path (first electric path) W5a is overvoltage; and the electric leakage breaker (third breaker) 42 configured to, when the overvoltage detector 91 determines the voltage of the primary electric path (first electric path) W5a to be overvoltage, interrupt supply of electric power from the external power supply 2 to the electric load 130.

As described above, the modified example 2 breaks the electric path when the voltage supplied from the external power supply 2 becomes overvoltage, and hence safety can be more improved, and malfunction of the system caused by overvoltage can be suppressed.

1.4 Modified Example 3

Figure 7:
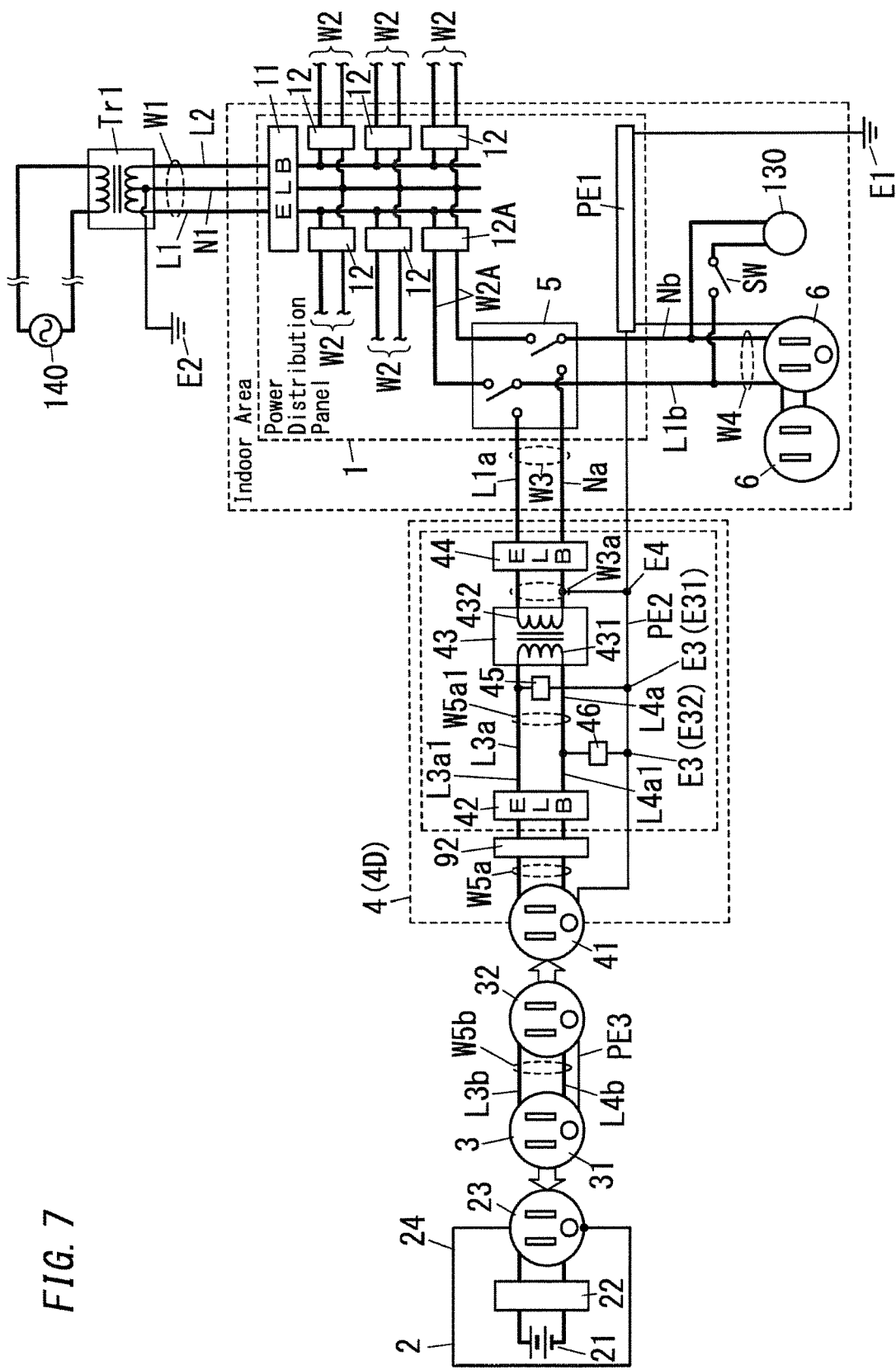
FIG. 7 is a circuit diagram illustrating an electric power supply system of a modified example 3 of the above embodiment.

FIG. 7 shows the electric power supply system of the modified example 3 according to the present embodiment. As shown in FIG. 7, in the modified example 3, there is an overvoltage breaker 92 provided to the primary electric path W5a.

The overvoltage breaker 92 functions as a switch for allowing and interrupting electric conduction through each of the voltage lines L3a and L4a, and functions as a comparator for comparing a value of voltage between the voltage lines L3a and L4a with a predetermined threshold value (fourth threshold value) K4. When the value of the voltage between the voltage lines L3a and L4a becomes greater than the threshold value K4, the overvoltage breaker 92 determines occurrence of overvoltage, and breaks the voltage lines L3a and L4a. In short, the overvoltage breaker 92 determines voltage with a value greater than the threshold value K4 to be overvoltage. For example, the threshold value K4 corresponds to a value of allowable voltage of the primary electric path W5a.

In summary, the electric power system protection device 4 (4D) of the modified example 3 further includes the overvoltage breaker 92 configured to interrupt supply of electric power from the external power supply 2 to the electric load 130 when determining the voltage of the primary electric path (first electric path) W5a to be overvoltage.

As described above, the modified example 3 breaks the electric path when the voltage supplied from the external power supply 2 becomes overvoltage, and hence safety can be more improved, and malfunction of the system caused by overvoltage can be suppressed.

1.5 Modified Example 4

Figure 8:
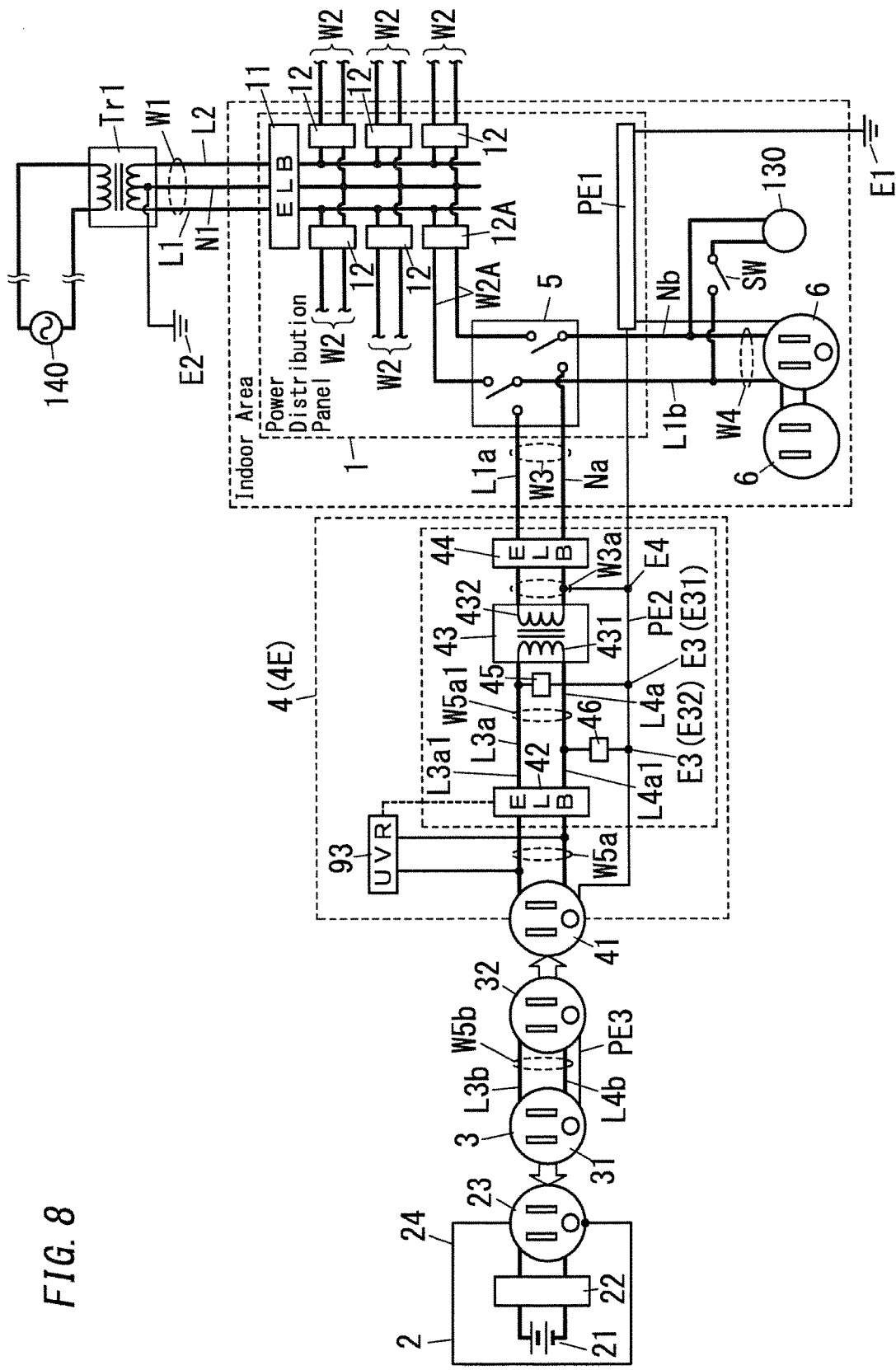
FIG. 8 is a circuit diagram illustrating an electric power supply system of a modified example 4 of the above embodiment.

FIG. 8 shows the electric power supply system of the modified example 4 according to the present embodiment. As shown in FIG. 8, the modified example 4 includes an undervoltage detector 93 configured to detect undervoltage between the voltage lines L3a and L4a of the primary electric path W5a (i.e., output voltage of the external power supply 2).

The electric leakage breaker 42 is an electric leakage breaker capable of being tripped by external signals. The undervoltage detector 93 is configured to, when a value of voltage between the voltage lines L3a and L4a becomes equal to or less than a predetermined threshold value (fifth threshold value) K5, determine occurrence of undervoltage and send an external tripping signal to the electric leakage breaker 42. In short, the undervoltage detector 93 determines voltage with a value equal to or less than the threshold value K5 to be undervoltage. For example, the threshold value K5 corresponds to a value of rated voltage of the primary electric path W5a.

The electric leakage breaker 42 is configured to, in response to reception of the external tripping signal, trip to break the voltage lines L3a and L4a.

In summary, the electric power system protection device 4 (4E) of the modified example 4 includes: the undervoltage detector 93 configured to determine whether voltage of the primary electric path (first electric path) W5a is undervoltage; and the electric leakage breaker 42 (the fourth breaker) configured to, when the undervoltage detector 93 determines the voltage of the primary electric path (first electric path) W5a to be undervoltage, interrupt supply of electric power from the external power supply 2 to the electric load 130.

As described above, the modified example 4 breaks the electric path when the voltage supplied from the external power supply 2 becomes undervoltage, and hence faulty operation of the system caused by undervoltage can be suppressed.

1.6 Modified Example 5

Figure 9:
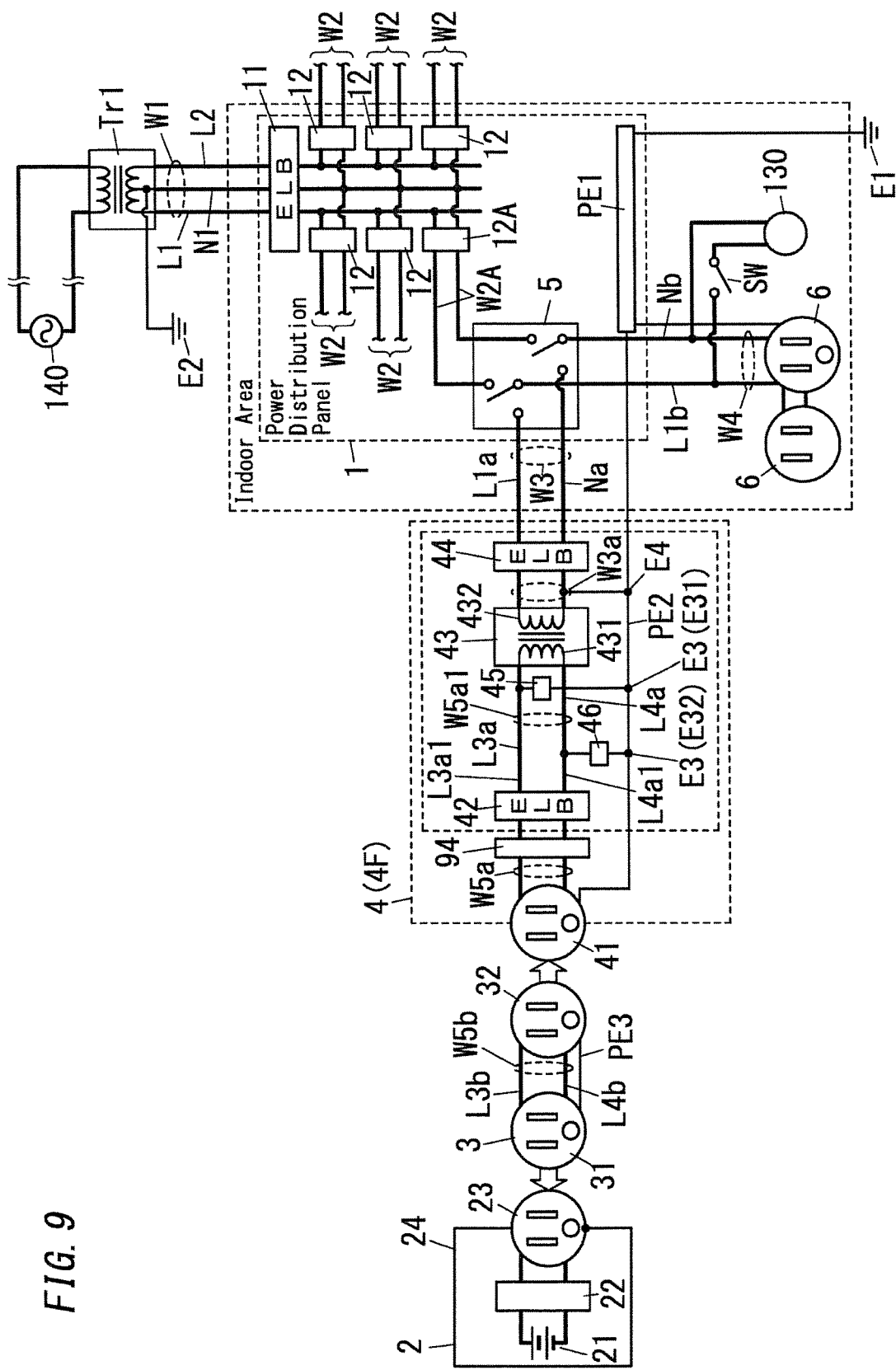
FIG. 9 is a circuit diagram illustrating an electric power supply system of a modified example 5 of the above embodiment.

FIG. 9 shows the electric power supply system of the modified example 5 according to the present embodiment. As shown in FIG. 9, in the modified example 5, there is an undervoltage breaker 94 provided to the primary electric path W5a.

The undervoltage breaker 94 functions as a switch for allowing and interrupting electric conduction through each of the voltage lines L3a and L4a, and functions as a comparator for comparing a value of voltage between the voltage lines L3a and L4a with a predetermined threshold value (sixth threshold value) K6. When the value of the voltage between the voltage lines L3a and L4a becomes equal to or less than the threshold value K6, the undervoltage breaker 94 determines occurrence of undervoltage, and breaks the voltage lines L3a and L4a. In short, the undervoltage breaker 94 determines voltage with a value equal to or less than the threshold value K6 to be undervoltage. For example, the threshold value K6 corresponds to a value of rated voltage of the primary electric path W5a.

In summary, the electric power system protection device 4 (4F) of the modified example 5 further includes the undervoltage breaker 94 configured to interrupt supply of electric power from the external power supply 2 to the electric load 130 when determining the voltage of the primary electric path (first electric path) W5a to be undervoltage.

As described above, the modified example 5 breaks the electric path when the voltage supplied from the external power supply 2 becomes undervoltage, and hence faulty operation of the system caused by undervoltage can be suppressed.

1.7 Modified Example 6

Figure 10:
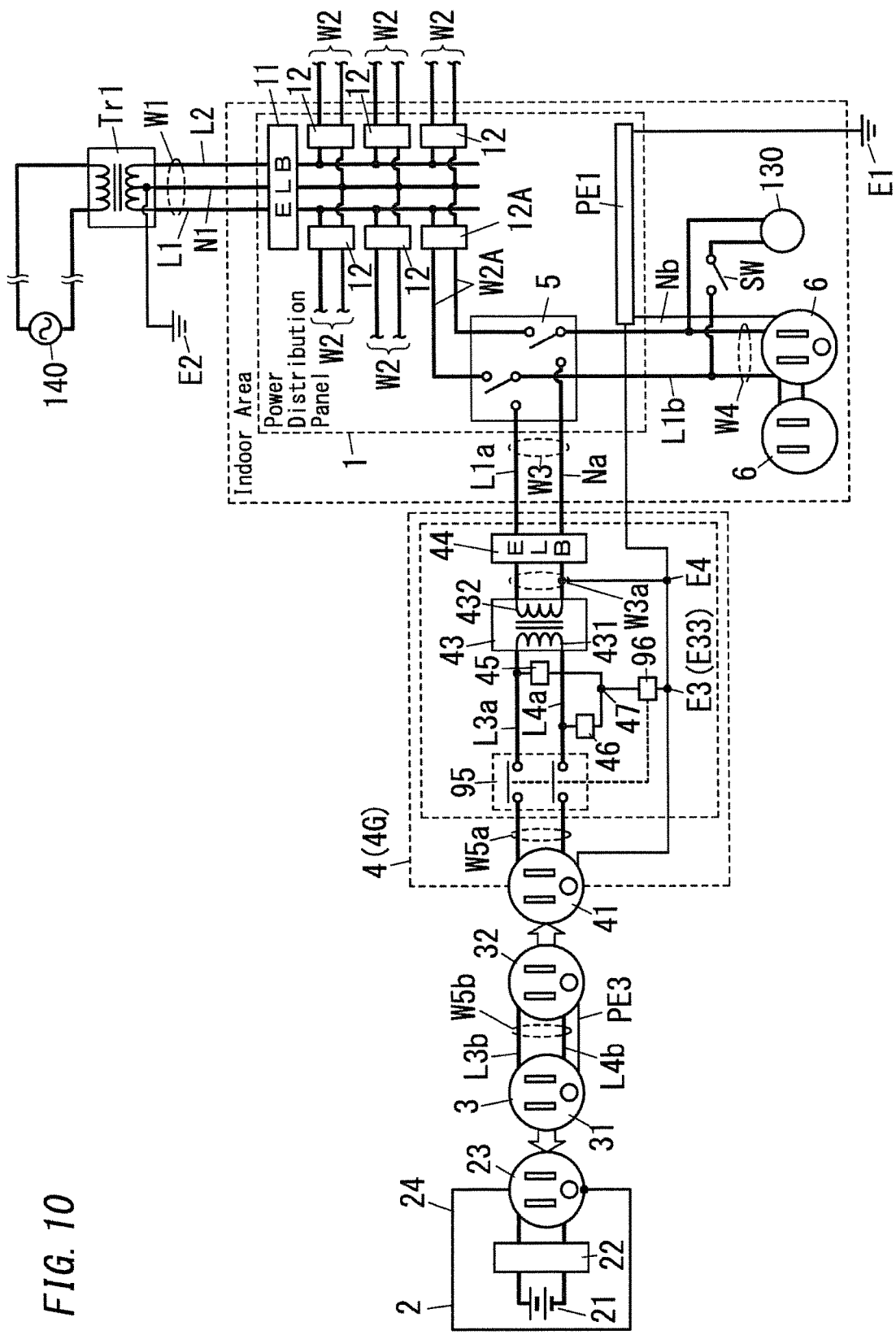
FIG. 10 is a circuit diagram illustrating an electric power supply system of a modified example 6 of the above embodiment.

FIG. 10 shows the electric power supply system of the modified example 6 according to the present embodiment. As shown in FIG. 10, in the modified example 6, the electric leakage breaker 42 serving as the first electric leakage detector and the first breaker is replaced with a switch 95 and an electric leakage detector 96.

In FIG. 10, grounded ends of the resistors 45 and 46 are interconnected to form a common end, and the common end of the resistors 45 and 46 is connected to the protective ground conductor PE2 through a ground part (first ground part) E33.

The electric leakage detector 96 is configured to detect current flowing from the common end of the resistors 45 and 46 to the protective ground conductor PE2, and thereby detect electric leakage.

The switch 95 is configured to allow and interrupt electric conduction through each of the voltage lines L3a and L4a in accordance with a result of the detection made by the electric leakage detector 96. In more details, when current flows from the common end of the resistors 45 and 46 to the protective ground conductor PE2 and thus the electric leakage detector 96 detects electric leakage, the switch 95 interrupts the voltage lines L3a and L4a.

As described above, the electric power system protection device 4 (4G) of the modified example 6 includes: the first electric leakage detector (electric leakage detector) 96 configured to detect electric leakage from the primary electric path (first electric path) W5a; and the second electric leakage detector (electric leakage breaker) 44 provided to the secondary electric path (second electric path) W3 and configured to detect electric leakage from the second electric path W3. Additionally, the electric power system protection device 4 (4G) of the modified example 6 includes: the first and second ground parts E3 (E33) and E4 which are to be grounded; the first resistor 45; and the second resistor 46. The first end of the first resistor 45 is connected to the first voltage line L3a of the pair of voltage lines L3a and L4a constituting the first electric path W5a. The first end of the second resistor 46 is connected to the second voltage line L4a of the pair of voltage lines L3a and L4a. The second end of the first resistor 45 and the second end of the second resistor 46 are interconnected. The first ground part E33 is connected to the connection point of the second end of the first resistor 45 and the second end of the second resistor 46. The second ground part E4 is connected to the part W3a, between the secondary winding 432 and the second electric leakage detector (electric leakage breaker) 44, of the second electric path W3. The first electric leakage detector (electric leakage detector) 96 is configured to detect electric leakage from the first electric path W5a on a basis of current flowing through the connection point.

Moreover, the electric power system protection device 4 (4G) of the modified example 6 further includes the first breaker (the switch 95 and the electric leakage breaker 44) configured to interrupt supply of electric power from the external power supply 2 to the electric load 130 when the first electric leakage detector (electric leakage detector) 96 detects electric leakage from the first electric path W5a or when the second electric leakage detector (electric leakage detector) 44 detects electric leakage from the second electric path W3.

Accordingly, when ground fault current occurs on the primary side of the transformer 43, the modified example 6 can detect electric leakage and interrupt supply of electric power from the external power supply 2 to the emergency load 130. Note that, the modified example 6 is in conformity with the CHAdeMO standard made for DC charging systems for electric vehicles.

1.8 Modified Example 7

Figure 11:
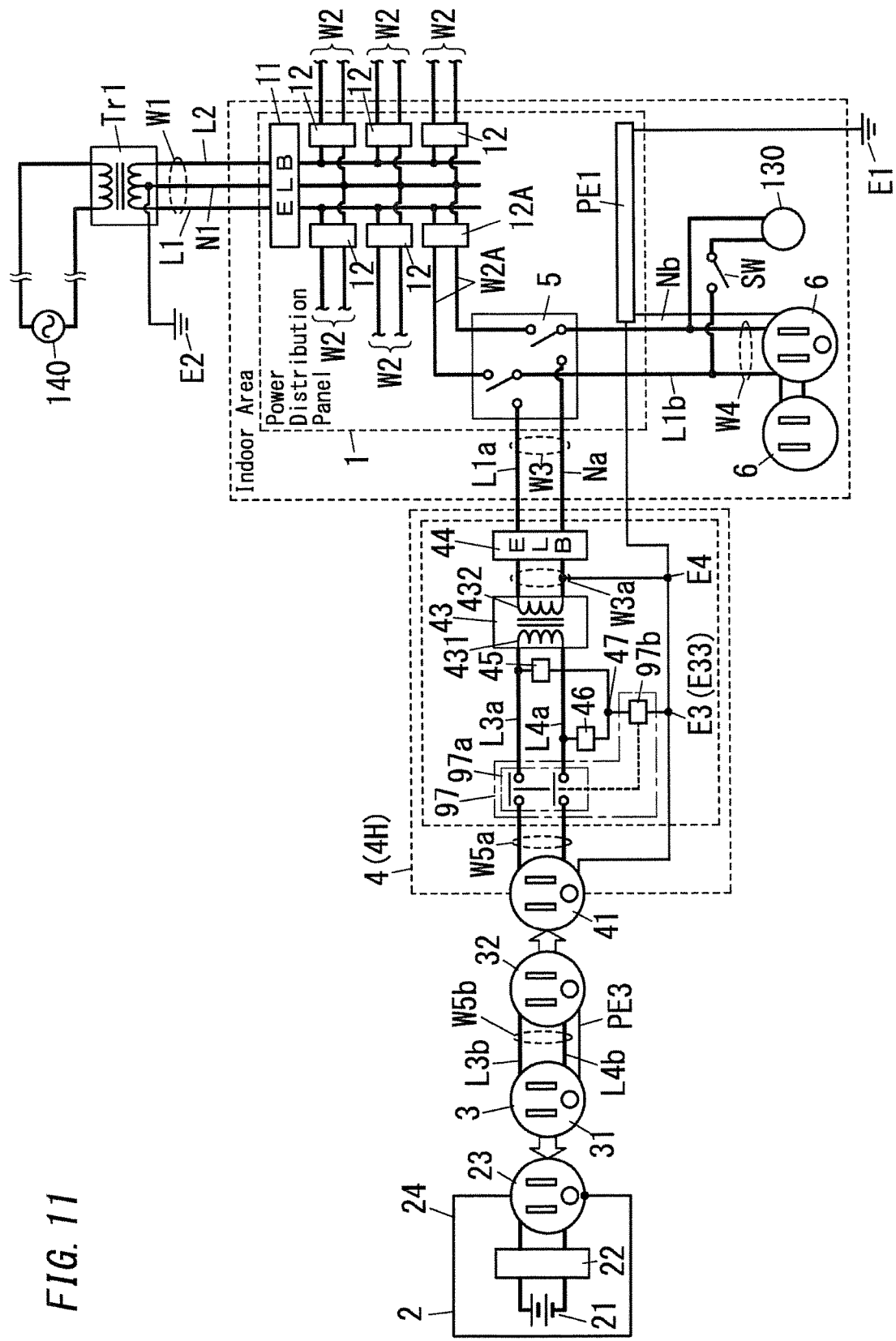
FIG. 11 is a circuit diagram illustrating an electric power supply system of a modified example 7 of the above embodiment.

FIG. 11 shows the electric power supply system of the modified example 7 according to the present embodiment. As shown in FIG. 11, in the modified example 7, the electric leakage breaker 42 serving as the first electric leakage detector and the first breaker is replaced with an electric leakage breaker 97.

In FIG. 11, grounded ends of the resistors 45 and 46 are interconnected to form a common end, and the common end of the resistors 45 and 46 is connected to the protective ground conductor PE2 through a ground part (first ground part) E33.

The electric leakage breaker 97 includes a switch 97a and an electric leakage detector 97b. The electric leakage detector 97b is configured to detect current flowing from the common end of the resistors 45 and 46 to the protective ground conductor PE2, and thereby detect electric leakage.

The switch 97a is configured to allow and interrupt electric conduction through each of the voltage lines L3a and L4a in accordance with a result of the detection made by the electric leakage detector 97b. In more details, when current flows from the common end of the resistors 45 and 46 to the protective ground conductor PE2 and thus the electric leakage detector 97b detects electric leakage, the switch 97a interrupts the voltage lines L3a and L4a.

As described above, the electric power system protection device 4 (4H) of the modified example 7 includes: the first electric leakage detector (electric leakage detector) 97b configured to detect electric leakage from the primary electric path (first electric path) W5a; and the second electric leakage detector (electric leakage breaker) 44 provided to the secondary electric path (second electric path) W3 and configured to detect electric leakage from the second electric path W3. Additionally, the electric power system protection device 4 (4H) of the modified example 7 includes: the first and second ground parts E3 (E33) and E4 which are to be grounded; the first resistor 45; and the second resistor 46. The first end of the first resistor 45 is connected to the first voltage line L3a of the pair of voltage lines L3a and L4a constituting the first electric path W5a. The first end of the second resistor 46 is connected to the second voltage line L4a of the pair of voltage lines L3a and L4a. The second end of the first resistor 45 and the second end of the second resistor 46 are interconnected. The first ground part E33 is connected to the connection point of the second end of the first resistor 45 and the second end of the second resistor 46. The second ground part E4 is connected to the part W3a, between the secondary winding 432 and the second electric leakage detector (electric leakage breaker) 44, of the second electric path W3. The first electric leakage detector (electric leakage detector) 97b is configured to detect electric leakage from the first electric path W5a on a basis of current flowing through the connection point.

Moreover, the electric power system protection device 4 (4H) of the modified example 7 further includes the first breaker (the switch 97a and the electric leakage breaker 44) configured to interrupt supply of electric power from the external power supply 2 to the electric load 130 when the first electric leakage detector (electric leakage detector) 97b detects electric leakage from the first electric path W5a or when the second electric leakage detector (electric leakage detector) 44 detects electric leakage from the second electric path W3.

Accordingly, when ground fault current occurs on the primary side of the transformer 43, the modified example 7 can detect electric leakage and interrupt supply of electric power from the external power supply 2 to the emergency load 130. Note that, the modified example 7 is in conformity with the CHAdeMO standard made for DC charging systems for electric vehicles.

2. Features

2.1 Electric Power System Protection Device

As described above, the electric power system protection device 4 of the present embodiment includes the following first feature.

In the first feature, the electric power system protection device 4 includes the transformer 43. The transformer 43 is provided between the first electric path (primary electric path) W5*a* to be connected to the external power supply 2 configured to convert charging power from the secondary battery 21 into AC power and output the AC power, and the second electric path (secondary electric path) W3 serving as an electric power supply path for electric loads (emergency loads) 130 capable of receiving commercial electric power. The transformer 43 includes the primary winding 431 to be connected to the first electric path W5*a* and the secondary winding 432 to be connected to the second electric path W3 so as to electrically insulate the first electric path W5*a* and the second electric path W3 from each other.

In other words, the electric power system protection device 4 includes a transformer 43 including a primary winding 431 and a secondary winding 432 which are electrically isolated from each other. The primary winding 431 is to be connected to a first electric path (primary electric path) W5 (W5*a* and W5*b*) which is to be connected to an external power supply 2 configured to supply AC power by use of a secondary battery 21, so as to receive the AC power from the external power supply 2. The secondary winding 432 is to be connected to a second electric path (secondary electric path) W3 to be connected to a power supply path from a commercial electric power system 140 to an electric load (emergency load) 130.

Further, the electric power system protection device according to the present embodiment may include one or more of the following second to eleventh features.

In the second feature realized in combination with the first feature, the electric power system protection device 4 includes: the first electric leakage detector (electric leakage breaker) 42 provided on the primary side of the transformer 43 and configured to detect electric leakage from the first electric path W5*a*; and the second electric leakage detector (electric leakage breaker) 44 provided to the secondary side of the transformer 43 and configured to detect electric leakage from the second electric path W3. The electric power system protection device 4 includes; the first ground part E3 (E31, E32) for grounding the first electric path W5*a* at a part between the primary winding 431 of the transformer 43 and the first electric leakage detector (electric leakage breaker) 42; and the second ground part E4 for grounding the second electric path W3 at a part between the secondary winding 432 of the transformer 43 and the second electric leakage detector (electric leakage breaker) 44.

In other words, the electric power system protection device 4 further includes: a first electric leakage detector (electric leakage breaker) 42; a second electric leakage detector (electric leakage breaker) 44; and first and second ground parts E3 and E4 which are to be grounded. The first electric leakage detector 42 is provided to the first electric path W5*a* and configured to detect electric leakage from the first electric path W5*a*. The second electric leakage detector 44 is provided to the second electric path W3 and configured to detect electric leakage from the second electric path W3. The first ground part E3 is connected to the part W5*a*1, between the primary winding 431 and the first electric leakage detector 42, of the first electric path W5*a*. The second ground part E4 is connected to the part W3*a*, between the secondary winding 432 and the second electric leakage detector 44, of the second electric path W3.

In the third feature realized in combination with the second feature, the first ground part E3 (E31, E32) is grounded through the resistor (the resistors 45 and 46).

In other words, the electric power system protection device 4A of the basic example further includes a resistor (the resistors 45 and 46). The first ground part E3 is connected to the first electric path W5*a* through the resistor (the resistors 45 and 46).

In the fourth feature realized in combination with the first feature, the voltage line L3*a* which is one of the pair of voltage lines L3*a* and L4*a* constituting the first electric path W5*a* is connected to the first end of the first resistor 45, and the voltage line L4*a* which is the other of the pair of voltage lines L3*a* and L4*a* is connected to the first end of the second resistor 46. The first ground part E3 (E33) grounds the common end where the second ends of the first and second resistors 45 and 46 are interconnected. The first electric leakage detector (electric leakage detector 96, 97*b*) is configured to detect electric leakage from the first electric path W5*a* on the basis of current flowing through the common end.

In other words, the electric power system protection device 4 includes: a first electric leakage detector (the electric leakage detector 96; 97*b*) configured to detect electric leakage from the primary electric path (first electric path) W5*a*; and a second electric leakage detector (electric leakage breaker) 44 provided to the secondary electric path (second electric path) W3 and configured to detect electric leakage from the second electric path W3. Additionally, the electric power system protection device 4 includes: first and second ground parts E3 (E33) and E4 which are to be grounded; a first resistor 45; and a second resistor 46. A first end of the first resistor 45 is connected to a first voltage line L3*a* of a pair of voltage lines L3*a* and L4*a* constituting the first electric path W5*a*. A first end of the second resistor 46 is connected to a second voltage line L4*a* of the pair of voltage lines L3*a* and L4*a*. A second end of the first resistor 45 and a second end of the second resistor 46 are interconnected. The first ground part E33 is connected to a connection point 47 of the second end of the first resistor 45 and the second end of the second resistor 46. The second ground part E4 is connected to a part W3*a*, between the secondary winding 432 and the second electric leakage detector (electric leakage breaker) 44, of the second electric path W3. The first electric leakage detector (the electric leakage detector 96; 97*b*) is configured to detect electric leakage from the first electric path W5*a* on a basis of current flowing through the connection point 47.

In the fifth feature realized in combination with any one of the second to fourth features, the electric power system protection device 4 includes the first breaker (the electric leakage breaker 42, 44; the switch 95, the electric leakage breaker 44; the switch 97*a*, the electric leakage breaker 44) configured to, when the first electric leakage detector (the electric leakage breaker 42; the electric leakage detector 96; the electric leakage detector 97*b*) or the second electric leakage detector (electric leakage breaker) 44 detects electric leakage, interrupt supply of electric power from the external power supply 2 to the electric load 130.

In other words, the electric power system protection device 4 further includes a first breaker (the electric leakage breaker 42, 44; the switch 95, the electric leakage breaker 44; the switch 97*a*, the electric leakage breaker 44) configured to interrupt supply of electric power from the external power supply 2 to the electric load 130 when the first electric leakage detector (the electric leakage breaker 42; the electric leakage detector 96; the electric leakage detector 97b) detects electric leakage from the first electric path W5a or when the second electric leakage detector 44 detects electric leakage from the second electric path W3.

In the sixth feature realized in combination with any one of the first to fifth features, the electric power system protection device 4 includes: the first overcurrent detector 7 configured to detect overcurrent by determining whether a value of current in the first electric path W5a is greater than the first threshold value; and the second overcurrent detector 8 configured to detect overcurrent by determining whether a value of current in the second electric path W3 is greater than the second threshold value.

In other words, the electric power system protection device 4 further includes a first overcurrent detector 7 and a second overcurrent detector 8. The first overcurrent detector 7 is configured to determine occurrence of overcurrent in the first electric path W5a when a value of current flowing through the primary electric path (first electric path) W5a is greater than a first threshold value K1. The second overcurrent detector 8 is configured to determine occurrence of overcurrent in the second electric path W3 when a value of current flowing through the secondary electric path (second electric path) W3 is greater than a second threshold value K2.

In the seventh feature realized in combination with the sixth feature, the electric power system protection device 4 includes the second breaker (the switch 73, 83) configured to interrupt supply of electric power from the external power supply 2 to the electric load 130 when the first overcurrent detector 7 or the second overcurrent detector 8 detects overcurrent.

In other words, the electric power system protection device 4 (4B) further includes a second breaker (the switch 73, 83) configured to interrupt supply of electric power from the external power supply 2 to the electric load 130 when the first overcurrent detector 7 determines occurrence of overcurrent in the primary electric path (first electric path) W5a or when the second overcurrent detector 8 determines occurrence of overcurrent in the secondary electric path (second electric path) W3.

In the eighth feature realized in combination with any one of the first to seventh features, the electric power system protection device 4 further includes: an overvoltage detector 91 configured to determine whether voltage across the primary winding 431 of the transformer 43 becomes overvoltage; and a third breaker (electric leakage breaker) 42 configured to interrupt supply of electric power from the external power supply 2 to the electric load 130 when the overvoltage detector 91 detects the overvoltage.

In the ninth feature realized in combination with any one of the first to seventh features, the electric power system protection device 4 includes an overvoltage breaker 92 configured to interrupt supply of electric power from the external power supply 2 to the electric load 130 when voltage across the primary winding 431 of the transformer 43 becomes overvoltage.

In the tenth feature realized in combination with any one of the first to ninth features, the electric power system protection device 4 includes an undervoltage detector 93; and a fourth breaker (electric leakage breaker) 42. The undervoltage detector 93 is configured to determine whether voltage across the primary winding 431 of the transformer 43 becomes undervoltage. The fourth breaker (electric leakage breaker) 42 is configured to interrupt supply of electric power from the external power supply 2 to the electric load 130 when the undervoltage detector 93 detects undervoltage.

In the eleventh feature realized in combination with any one of the first to ninth features, the electric power system protection device 4 further includes an undervoltage breaker 94 configured to interrupt supply of electric power from the external power supply 2 to the electric load 130 when voltage across the primary winding 431 of the transformer 43 becomes undervoltage.

As described above, in the electric power system protection device 4 of the present embodiment, the first electric path W5a and the second electric path W3 are electrically isolated from each other by the transformer 43, and hence effects on one of the external power supply and the commercial electric power system caused by the other can be reduced. Therefore, even if electric failure occurs in one of the external power supply 2 and the commercial electric power system 140, the electric power system protection device 4 of the present embodiment can offer an advantage that effects on the other caused by such electric failure can be minimized.

2.2 Electric Path Switching Device

The electric path switching device 5 of the present embodiment is to be used in combination with the electric power system protection device 4 of the present embodiment. The electric path switching device 5 connects the third electric path (emergency electric path) W4 to be connected to the electric load 130, to one selected from the second electric path (secondary electric path) W3 and the fourth electric path (branch electric path) W2A to receive commercial electric power.

In the electric path switching device 5 of the present embodiment, while commercial electric power is supplied, the third electric path W4 is connected to the fourth electric path W2A. While commercial electric power is not supplied, the third electric path W4 is connected to the second electric path W3.

In other words, the electric path switching device 5 of the present embodiment has the following twelfth feature.

In the twelfth feature, the electric path switching device includes a switching circuit 50. The switching circuit 50 includes a first terminal 501, a second terminal 502, and a third terminal 503. The first terminal 501 is to be connected to a third electric path (emergency electric path) W4 to be connected to an electric load 130. The second terminal 502 is to be connected to a fourth electric path (branch electric path) W2A to be connected to a commercial electric power system 140. The third terminal 503 is to be connected to the electric power system protection device 4 having the first feature. The switching circuit 50 is configured to connect the first terminal 501 to either one of the second terminal 502 and the third terminal 503. Note that, the electric power system protection device 4 may have any one or more of the second to eleventh features.

Further, the electric path switching device 5 of the present embodiment may have any one or more of the following thirteenth and fourteenth features.

In the thirteenth feature realized in combination with the twelfth feature, the switching circuit 50 is configured to, when the commercial electric power system 140 is available, connect the first terminal 501 to the second terminal 502. The switching circuit 50 is configured to, when the commercial electric power system 140 is unavailable, connect the first terminal 501 to the third terminal 503.

In the fourteenth feature realized in combination with the twelfth or thirteenth feature, the electric path switching device 5 further includes a control circuit 51. The control circuit 51 is configured to, when the commercial electric power system 140 is available, control the switching circuit 50 so as to connect the first terminal 501 to the second terminal 502. The control circuit 51 is configured to, when the commercial electric power system 140 is unavailable, control the switching circuit 50 so as to connect the first terminal 501 to the third terminal 503.

As described above, in the electric path switching device 5 of the present embodiment, the second electric path W3 and the fourth electric path W2A are mechanically separated from each other, and hence effects on one of the external power supply 2 and the commercial electric power system 140 caused by the other can be reduced. Therefore, even if electric failure occurs in one of the external power supply 2 and the commercial electric power system 140, the electric path switching device 5 of the present embodiment can offer an advantage that effects on the other caused by such electric failure can be minimized.

2.3 Electric Power Supply System

The electric power supply system of the present embodiment includes the electric power system protection device 4 and the electric path switching device 5. The electric power system protection device 4 includes the transformer 43. The transformer 43 is provided between the first electric path W5a to be connected to the external power supply 2 configured to convert charging power from the secondary battery 21 into AC power and output the AC power, and the second electric path W3 serving as an electric power supply path for electric loads capable of receiving commercial electric power. The transformer 43 includes the primary winding 431 to be connected to the first electric path W5a and the secondary winding 432 to be connected to the second electric path W3 so as to electrically insulate the first electric path W5a and the second electric path W3 from each other.

In other words, the electric power supply system according to the present embodiment includes: the electric power system protection device 4 having the first feature; and the electric path switching device 5 having the twelfth feature. Note that, the electric power system protection device 4 may include any one or more of the second to eleventh features, and the electric path switching device 5 may include any one or more of the thirteenth and fourteenth features.

As described above, in the electric power supply system of the present embodiment, the electric power system protection device 4 electrically isolates the first electric path W5a and the second electric path W3 from each other, and the electric path switching device 5 mechanically separates the second electric path W3 and the fourth electric path W2A from each other. Therefore, even if electric failure occurs in one of the external power supply 2 and the commercial electric power system 140, the electric power supply system of the present embodiment can offer an advantage that effects on the other caused by such electric failure can be minimized.

The invention claimed is:

1. An electric path switching device comprising a switching circuit including: a first terminal to be connected to a third electric path to be connected to an electric load;
a second terminal to be connected to a fourth electric path to be connected to a commercial electric power system; and a third terminal to be connected to a second electric path to be connected to an electric power supply system protection device and a power supply path from the commercial electric power system to the electric load,
wherein the switching circuit is configured to connect the first terminal to either one of the second terminal and the third terminal,
wherein the electric power supply system protection device is connected to a first electric path which is to be connected to an external power supply configured to supply AC power by use of a secondary battery, so as to receive the AC power from the external power supply,
wherein the electric power supply system protection device comprises:
an overvoltage detector configured to detect overvoltage at the first electric path;
a breaker configured to interrupt supply of electric power from the external power supply to the electric load when the overvoltage detector detects the overvoltage; and
an inlet, and
wherein the first electric path includes a connection cable that includes one end connected to the external power supply and another end provided with a plug connected to the inlet.

2. The electric path switching device according to claim 1, wherein
the switching circuit is configured to:
when the commercial electric power system is available, connect the first terminal to the second terminal; and
when the commercial electric power system is unavailable, connect the first terminal to the third terminal.

3. The electric path switching device according to claim 1, further comprising a control circuit,
the control circuit being configured to:
when the commercial electric power system is available, control the switching circuit so as to connect the first terminal to the second terminal; and
when the commercial electric power system is unavailable, control the switching circuit so as to connect the first terminal to the third terminal.

* * * * *